(12) United States Patent
Panigrahy

(10) Patent No.: US 12,541,438 B1
(45) Date of Patent: Feb. 3, 2026

(54) REFERENCE-BASED BACKUP

(71) Applicant: Hewlett Packard Enterprise Development LP, Spring, TX (US)

(72) Inventor: Padmagandha Panigrahy, San Diego, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/974,160

(22) Filed: Dec. 9, 2024

(51) Int. Cl.
*G06F 11/14* (2006.01)

(52) U.S. Cl.
CPC ...... *G06F 11/1469* (2013.01); *G06F 2201/80* (2013.01)

(58) Field of Classification Search
CPC ............. G06F 11/1469; G06F 2201/80; G06F 16/2365; G06F 11/1458; G06F 2201/84
See application file for complete search history.

(56) References Cited

U.S. PATENT DOCUMENTS

| | | | |
|---|---|---|---|
| 2022/0012134 A1* | 1/2022 | Chatterjee | ........... H04L 67/1097 |
| 2024/0007505 A1* | 1/2024 | Mohanty | ................. G06F 3/062 |

* cited by examiner

*Primary Examiner* — Ajay M Bhatia
*Assistant Examiner* — Cindy Nguyen
(74) *Attorney, Agent, or Firm* — Slater Matsil, LLP

(57) ABSTRACT

In some implementations, a computer system includes one or more processors and a non-transitory computer-readable medium storing programming for execution by the one or more processors. The programming includes instructions to receive a request to create a second air-gapped backup corresponding to a second transient backup. The second transient backup is subsequent to a first transient backup corresponding to a first air-gapped backup. The programming includes instructions to determine, in response to the request, whether the second transient backup matches the first transient backup, and to create, in response to determining that the second transient backup matches the first transient backup, a database entry for the second air-gapped backup that references the first air-gapped backup. The programming includes instructions to increment, in response to determining that the second transient backup matches the first transient backup, a reference counter for the first air-gapped backup.

18 Claims, 9 Drawing Sheets

REFERENCE-BASED BACKUP

BACKGROUND

Backup and recovery solutions allow business continuity and data integrity. The backup systems typically involve creating periodic copies of data and storing the copies in one or more locations to protect against data loss, corruption, or natural disaster. As data volumes continue to grow, it may be appropriate for backup solutions to balance comprehensive protection with relatively efficient resource utilization to reduce storage costs and network bandwidth consumption.

BRIEF DESCRIPTION OF THE DRAWINGS

For a more complete understanding of this disclosure, and advantages thereof, reference is now made to the following descriptions taken in conjunction with the accompanying drawings, in which.

DESCRIPTION

Figure 1:
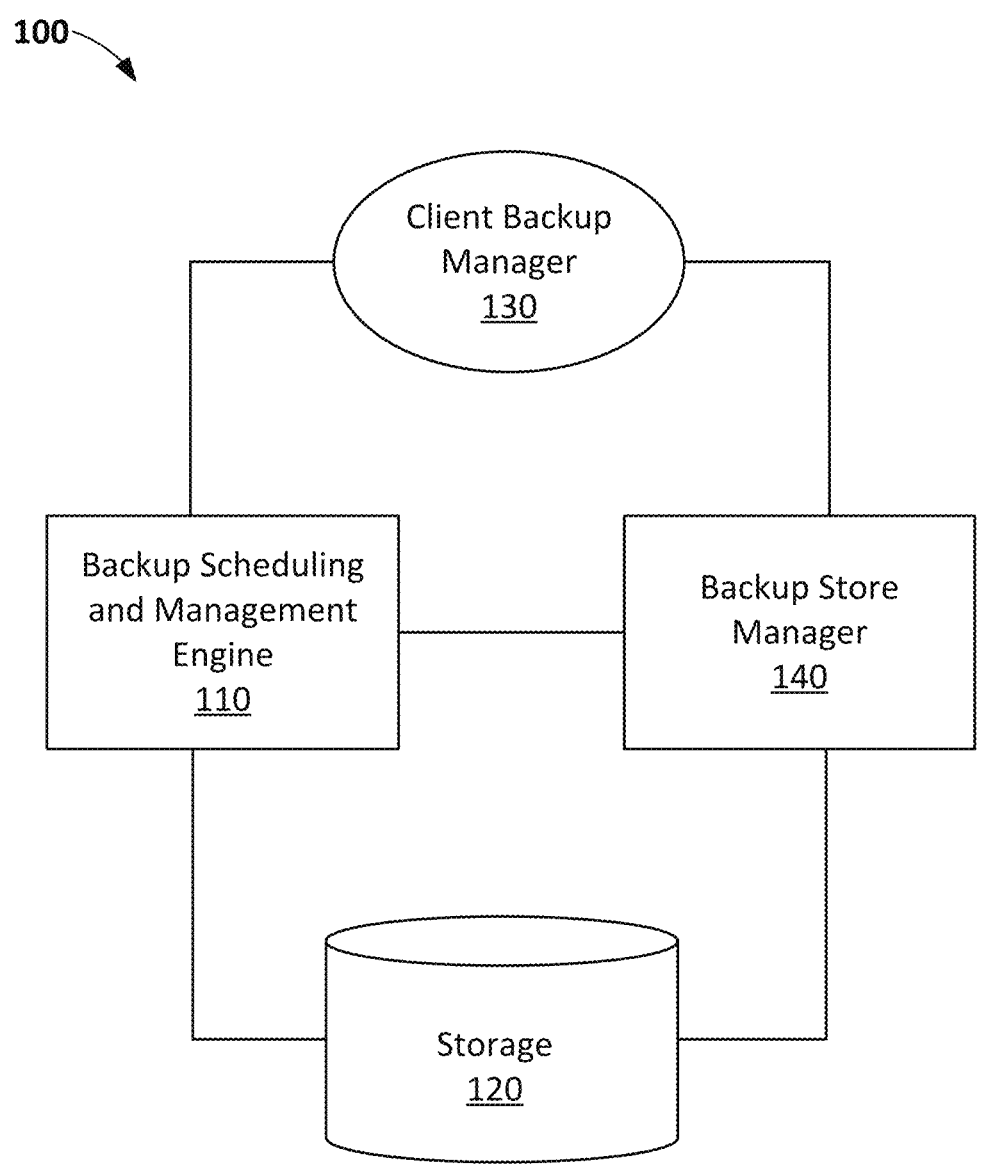
FIG. 1 illustrates an example backup system, according to some implementations.

Hybrid cloud storage provides one storage technique used in enterprise data protection strategies. Organizations may rely on cloud services for their operations, and it may be appropriate for clients to have backup and recovery solutions that can integrate with one or more cloud environments. It may be appropriate for such solutions to protect data across multiple platforms and be available to provide integrity when potential threats or system failures occur.

Air-gapped backup is a security measure for data protection, which may be created by a physical or logical separation between primary data storage and backup systems. Air-gapped backups may provide a layer of defense against cyber threats, including ransomware attacks. The air-gapped backup allows backup data to remain relatively isolated and recoverable if primary systems are compromised or otherwise become unavailable.

Implementing air-gapped backups may involve managing the relatively complex hybrid cloud environments, improving storage utilization, and reducing data transfer costs while maintaining the relative integrity and accessibility of backup data. It may be appropriate for backup systems to handle increasingly large datasets efficiently.

Deduplication technologies may reduce the amount of data to be stored and transferred during backup operations. By identifying and reducing or eliminating redundant data blocks, deduplication may decrease storage requirements and network bandwidth usage. However, integrating deduplication with air-gapped backups (e.g., air-gapped cloud backups) may cause difficulty to maintain both efficiency and security of the data.

The scheduling and execution of backup operations may be challenging. It may be appropriate for backup systems to have relatively regular, consistent backups to reduce the impact on production systems and improve resource utilization. Such backups may involve implementing scheduling processes and using incremental backup techniques to capture changed data, and potentially only the changed data.

In some cases, scheduled backups may occur when no changes have been made to the data since the previous backup. This scenario can present several challenges for backup systems. When no changes are detected, some backup processes may still initiate a full backup workflow, potentially consuming unnecessary resources. This may involve extensively communicating with cloud storage systems, transferring data, and creating new backup objects, even when the data remains relatively identical to the previous backup.

Such redundant and/or unnecessary operations may lead to increased costs in terms of storage utilization, network bandwidth consumption, and processing time. The unnecessary backups may extend backup windows, potentially impacting system performance during peak hours. For organizations with large datasets or frequent backup schedules, the cumulative effect of so-called no-change backups can result in significant resource waste and increased operational costs.

Managing and tracking multiple relatively identical backups may complicate restore processes and increase storage management overhead. It may be appropriate for users to navigate through numerous backup instances to locate the desired recovery point, even when some of these instances contain relatively identical data.

Certain implementations of this disclosure provide techniques for efficiently handling no-change backup scenarios. No-change backup scenarios may occur when a backup operation is initiated, but no modifications (e.g., as determined according to an applicable standard, such as a match determination standard, as described below) have occurred in the source data since the previous backup. This disclosure contemplates no-change backup scenarios including situations in which no modifications have occurred in the source data since the previous backup and/or scenarios in which some modifications within a defined tolerance or according to other match criteria have occurred. In other words, in some implementations, a no-match backup scenario may allow for differences to exist between the source data and the previous backup and yet for the system still to determine that the source data and the previous backup match. As a particular example, in some cases, no-change backup scenarios may involve large datasets where none or only a small portion of the data is modified between backup intervals. All or a majority of the data may remain substantially unchanged, potentially leading to redundant backup operations for unchanged data if the backup system disclosed herein is not used.

In some implementations, the no-change backup scenarios may occur when backup schedules are more frequent than the rate of data changes. For example, a backup system may be configured to perform daily backups, but the data may only change weekly. No-change backup scenarios may occur in certain types of systems or applications where data modifications are relatively infrequent by nature. In some implementations, these systems or applications may include archival systems, reference databases, or configuration repositories that may be updated relatively sporadically. Some implementations of the backup system disclosed herein may reduce unnecessary data transfers and storage duplication while maintaining the integrity and accessibility of backup data.

Certain implementations of this disclosure relate to improving air-gapped backups. In particular, certain implementations provide a reference technique that may improve the efficiency of storage and data transfer in backup operations, particularly when there are no changes in data that is being backed up.

Certain implementations may perform differential checks on backup data to determine if changes have occurred since the last backup. If no changes are detected, the system may be configured to create a reference to the previous backup and increment a reference counter. In some implementations, the system creates the reference to the previous backup (and increments the reference counter) rather than creating a new backup. In some implementations, such technique avoids or reduces unnecessary data transfers and storage.

This approach may address several challenges associated with no-change backup scenarios. As described above, in some backup systems, even when no data changes have occurred, the backup system may still initiate a full backup workflow. This can result in unnecessary resource consumption, including relatively extensive communication with cloud storage systems, transferring relatively identical data, and creating redundant backup objects. By implementing a reference-based system, the backup process may reduce or eliminate these redundant operations.

The reference technique may reduce storage utilization by reducing or eliminating storage of duplicate data for unchanged backups. The reference technique may also minimize network bandwidth consumption by avoiding or reducing unnecessary data transfers when no changes are detected. Additionally, processing time may be reduced as the backup system may skip the data extraction and storage steps for unchanged backups.

For organizations with large datasets or frequent backup schedules, this approach may lead to cost savings and improved operational efficiency. It may shorten backup windows, potentially reducing the impact on system performance during peak hours. The reference-based backup system may simplify backup management and restore processes by reducing the number of redundant backup instances that users navigate through to locate target recovery points.

By efficiently handling no-change backup scenarios, certain implementations of this disclosure may maintain the integrity and accessibility of backup data while improving resource utilization and reducing operational costs associated with backup operations.

For backups with changes, the system may follow a traditional backup process using backend microservices to extract changed data blocks and store them in a cloud object store. The backend microservices may include components such as a virtual management engine (e.g., a cloud virtual appliance manager), a data extraction engine, and a cloud object store manager (which may include an object store engine and an object storage repository).

Certain implementations may provide relatively faster backups when no changes (according to an applicable policy) have occurred by avoiding or reducing backend processing. Certain implementations may operate with various cloud providers and asset types, making certain implementations applicable for various enterprise backup solutions.

In some implementations, the data protection engine may be configured to create a first transient backup corresponding to a first air-gapped backup for point-in-time data of a client asset in a client account. Point-in-time data may be a snapshot of information at a specific moment in time, captured from a system database or storage device. Point-in-time data may be used to restore data to a specific moment in the past, allowing data integrity and recovery from failures. Point-in-time data may include file content, metadata, system state information. Point-in-time data can be analyzed for data evolution. Techniques for creating and managing point-in-time data may include full backups, incremental backups, and continuous data protection, which may be impacted by factors such as data nature, frequency of changes, and/or recovery point objectives.

A transient backup may be a short-lived native backup corresponding to an air-gapped backup for a particular time, which in this example is a first air-gapped backup. The data protection engine may be configured to check if another short-lived native backup (e.g., a second transient backup corresponding to a second air-gapped backup) matches the previous short-lived native backup (e.g., the first transient backup); and create an air-gapped backup database entry for the second air-gapped backup if no or substantially no (depending on implementation) differential data blocks exist between the second transient backup and the first transient backup.

The system may be configured to store a previous air-gapped backup identification in the current air-gapped backup database entry and increment a reference counter for the previous air-gapped backup database entry. This approach may reduce the cost and complexity associated with managing air-gapped backups, particularly in scenarios where data being backed up may change infrequently.

Turning to the figures, FIG. 1 illustrates an example backup system 100, according to some implementations. In the illustrated example, the backup system 100 includes a backup scheduling and management engine 110, a client backup manager 130, a backup store manager 140, and storage 120.

In some aspects, the backup system 100 may be configured to coordinate backup operations, manage client data, schedule backups, and store backup data. The backup scheduling and management engine 110 may be configured to manage and coordinate backup operations. In some aspects, the backup scheduling and management engine 110 may include various front-end components such as a policy management engine, scheduling engine, inventory management engine, and a data protection management engine. These components may interface with a storage (which may include a database) of backup scheduling and management engine 110 and allow data to be backed up and stored according to defined schedules and policies.

The client backup manager 130 may be configured to facilitate backup operations for client data. In some cases, the client backup manager 130 may interact with the backup scheduling and management engine 110 to manage the backup process. The client backup manager 130 may be configured to check for differential data between backups to identify whether changes have occurred since the last backup. As an example, the client backup manager 130 may determine, in response to the request to create the second air-gapped backup, whether there is an absence of a difference between the second transient backup and the first transient backup.

When no differential data blocks exist between the second transient backup and the first transient backup, such absence of the differential data indicates that the data content captured in both backups is relatively identical. No differential blocks may occur in several scenarios, for example, when there are no changes to the source data; when the first and second transient backups may be relatively identical snapshots; when the data block-level comparison does not indicate change in data; when there is a byte-level similarity; and/or when a file-level equivalence (e.g., according to an applicable standard) is identified.

As an example, no differential data blocks exist when the original data source has not been modified between the creation of the first and second transient backups. In some implementations, no differential data blocks exist when the first and second transient backups may represent relatively the same point-in-time snapshot of the data. In some implementations, no differential data blocks exist when comparing the two transient backups at a data block level, no differences (e.g., according to an applicable standard) are detected in the data blocks. In some implementations, no differential data blocks exist if a byte-by-byte comparison is performed, no differences may be found between the two transient backups. In some implementations, no differential data blocks exist when, in file-based backup systems, the files in both transient backups have relatively identical content, timestamps, and metadata.

The backup store manager 140 may facilitate storage of backups. In some aspects, the backup store manager 140 may be communicatively coupled between the backup scheduling and management engine 110 and the storage 120. The backup store manager 140 may include components such as a virtual management engine (e.g., a cloud virtual appliance manager), data extraction engine, and cloud object store manager. These components may facilitate storage of backups in an object storage repository (e.g., in a cloud object store).

The storage 120 may have various types of memory, including volatile and nonvolatile memory. For example, the storage 120 may include random-access memory (RAM), read-only memory (ROM), a hard disk drive (HDD), solid-state drive (SSD), and the like. Different types of memory may be used for different data storage needs. For example, the processor may boot from ROM, maintain nonvolatile storage in an HDD, execute program code stored in RAM, and store data under processing in RAM. The storage 120 may include a non-transitory computer readable medium that stores instructions for execution by the processor (e.g., processors 330 and/or 340 illustrated in FIG. 3). One or more modules within the storage 120 may be partially or wholly embodied as software and/or hardware for performing any functionality described herein.

The storage 120 may include a relational or non-structured query language (NoSQL) database that may store metadata, configuration information, and operational data for the backup system 100. The storage 120 may be managed by backup scheduling and management engine 110. The storage 120 may be configured to store database entries.

The backup system 100 may be configured to perform differential checks on backup data to identify whether changes have occurred since the last backup. In scenarios where no changes are detected, the backup system 100 may create a reference to the previous backup and increment a reference count, thereby avoiding or reducing unnecessary data transfers and storage.

No-change backup scenarios may occur when initiating a backup operation reveals no modifications to the source data since the previous backup. The no-change backup scenarios may occur in certain situations, such as when backup schedules are more frequent than data change rates, or in systems with large datasets where relatively small portions are modified between the backups. Certain types of systems or applications, such as archival systems, reference databases, or configuration repositories, may have relatively more no-change backup scenarios due to relatively infrequent data modifications.

In some implementations, the client backup manager 130 may detect the no-change scenarios when comparing the current state of data with the previous backup state. In some cases, when a no-change scenario is identified, the backup store manager 140 might not need to transfer or store new data. Instead, the backup store manager 140 may update metadata and/or reference counters in the storage 120 to indicate that the new backup point references the existing data.

The backup scheduling and management engine 110 may be configured to recognize patterns of no-change scenarios over time. In some implementations, this information may be used to dynamically adjust backup schedules, potentially reducing the frequency of backups for data that rarely changes.

In some aspects, the backup system 100 may handle no-change scenarios differently based on the type of the backup being performed. For instance, full backups may create a new reference to existing data, while incremental backups may record that no changes occurred since the last backup point.

Certain implementations of this disclosure relate to improving air-gapped backups. In particular, certain implementations provide a reference technique that may improve the efficiency of the backup store manager 140 and data transfer in backup operations, particularly when there are no changes in data that is being backed up.

Certain implementations may perform differential checks on backup data to determine if changes have occurred since the last backup. If no changes are detected, the backup system 100 may be configured to create a reference to the previous backup and increment a reference counter. In some implementations, the backup system 100 creates the reference to the previous backup (and increments the reference counter) rather than creating a new backup. In some implementations, such technique avoids or reduces unnecessary data transfers and storage.

Certain implementations may include a backup scheduling and management engine 110 with front-end components including a policy management engine, scheduling engine, inventory management engine, and data protection engine. These components may interface with a storage (which may include a database). The backup scheduling and management engine 110 may communicate with a client backup manager 130 and a backup store manager 140 to coordinate backup operations.

Figure 2:
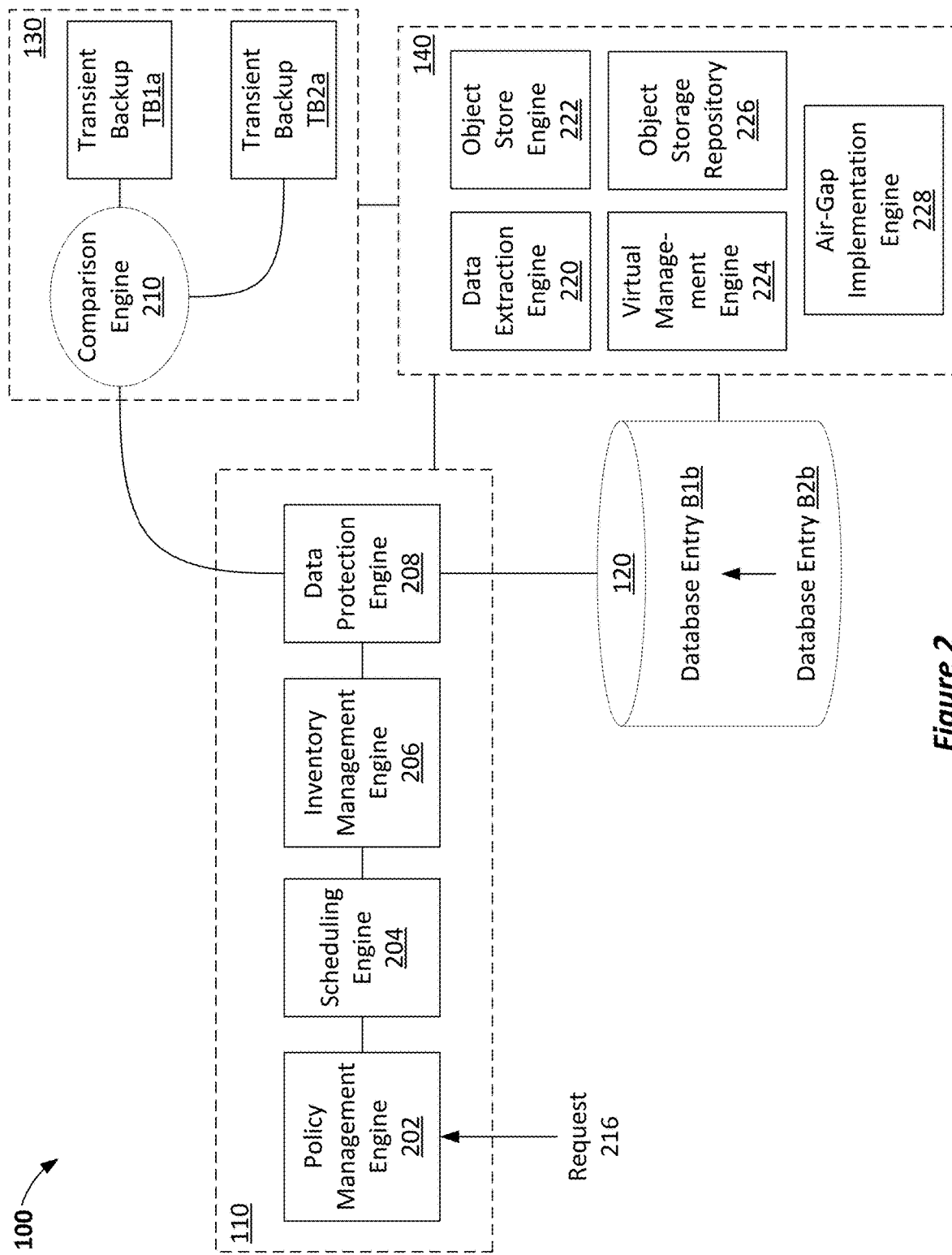
FIG. 2 illustrates an example backup system, according to some implementations.

FIG. 2 illustrates an example backup system 100, according to some implementations. The backup scheduling and management engine 110 may include various front-end components such as a policy management engine 202, a scheduling engine 204, an inventory management engine 206, and a data protection engine 208. These components may be communicatively coupled with a storage 120 and back up and store data according to defined schedules and policies.

The policy management engine 202 may be configured to manage backup policies. In some cases, the policy management engine 202 may receive a backup request 216 and initiate the backup process. The scheduling engine 204 may be configured to schedule backup operations. In some aspects, the scheduling engine 204 may communicate with the data protection engine 208 to coordinate the timing of backup operations.

The inventory management engine 206 may be configured to manage an inventory of client assets. In some cases, the inventory management engine 206 may communicate with the data protection engine 208 to provide details of the client assets for which a backup may be appropriate.

The data protection engine 208 may be configured to manage the protection of data during backup operations. In some aspects, the data protection engine 208 may communicate with the client backup manager 130 and the backup store manager 140 to coordinate the backup process.

The client backup manager 130 may include a comparison engine 210 that compares a transient backup TB1$a$ and a transient backup TB2$a$ to determine whether the transient backups (e.g., TB1$a$ and TB2$a$) or their corresponding air-gapped backups match. The comparison engine 210 may be communicatively coupled to the data protection engine 208. The comparison may be performed by comparing hashes of the transient backups (e.g., TB1$a$ and TB2$a$) or their corresponding air-gapped backups, comparing checksums of the transient backups (e.g., TB1$a$ and TB2$a$) or their corresponding air-gapped backups, and/or according to any other suitable techniques for comparing the similarity of data sets.

In some implementations, the backup system 100 (e.g., the client backup manager 130) may determine whether transient backups (e.g., TB1$a$ and TB2$a$) or their corresponding air-gapped backups (e.g., first air-gapped backup and second air-gapped backup) match according a match determination standard. The match determination standard might or might not specify that an exact match is to be used. For example, the match determination standard may specify that the transient backups (or their corresponding air-gapped backups) must match each other exactly or may specify that the transient backups (or their corresponding air-gapped backups) may match within a particular tolerance or according to other match criteria. In other words, in some implementations, the match determination standard may allow for differences to exist between transient backups and yet for the backup system 100 still to determine that the transient backups match.

For example, in implementations in which the match determination standard specifies that the transient backups (or their corresponding air-gapped backups) must match each other exactly, the comparison of transient backups (or their corresponding air-gapped backups) may include comparing hashes of the transient backups (e.g., TB1$a$ and TB2$a$) or their corresponding air-gapped backups to determine whether the hashes match exactly, comparing checksums of the transient backups (e.g., TB1$a$ and TB2$a$) or their corresponding air-gapped backups to determine whether the checksums match exactly, and/or using any other suitable techniques for comparing the similarity of data sets to determine whether an exact match exists.

As another example, in implementations in which the match determination standard allows for deviations between the first and second transient backups TB1$a$ and TB2$a$ (or their corresponding first and second air-gapped backups) while still recognizing them to match each other. In some implementations, this tolerance for minor differences may be implemented using one or more of a threshold-based comparison, metadata-focused matching, checksum tolerance, time-based deviation allowance, selective block comparison, and/or fuzzy matching algorithms. As a particular example, the client backup manager 130 may employ a comparison algorithm that allows for a small percentage of difference between the backups. For example, if less than 0.1% of data blocks differ, the backups may still be considered matching.

In some implementations, the client backup manager 130 may primarily compare relatively high priority metadata rather than performing a full byte-by-byte comparison. If relatively high priority metadata elements match, the backups may be considered relatively equivalent even if there are slight differences in data with less priority.

In some implementations, when comparing backups, the backup store manager 140 may use checksums with a built-in tolerance for relatively minor variations. This approach may allow backups with relatively insignificant differences to be treated as matches. In some implementations, the scheduling engine 204 may consider backups taken within a very short time window (e.g., milliseconds apart) as matching, even if there are slight differences due to ongoing system processes.

In some implementations, the data extraction engine 220 may focus on comparing specific relatively important data blocks rather than the entire backup. If these relatively important data blocks match, the backups may be considered relatively equivalent. In some implementations, matching algorithms implemented in the object store engine 222 may allow for fuzzy matching, where backups with relatively high similarity but not exact identity are considered matches.

The air-gap implementation engine 228 may apply similar tolerance mechanisms when comparing air-gapped backups, managing isolated backup copies while accommodating relatively minor variations that do not substantially impact the overall data protection strategy.

While the described implementation refers to a client backup manager 130, it should be understood that this component can take various forms and is not limited to a client-server model. The functionality of the client backup manager 130 can be implemented in various ways, for example, a server-side agent, embedded system, distributed application, container-based service, serverless function, plugin or extension, virtual appliance, mobile application, command-line interface tool, API endpoint, middleware component, integrated backup service, peer-to-peer agent, browser extension, internet of things (IoT) device manager, and/or other suitable implementations.

The backup store manager 140 may include several engines: a data extraction engine 220, an object store engine 222, a virtual management engine 224, and an air-gap implementation engine 228. These components may manage the storage of transient backups TB1$a$ and TB2$a$ and corresponding air-gapped backups in an object storage repository 226 (e.g., in a cloud object store).

In some implementations, transient backups TB1$a$ and TB2$a$ are short-lived native backups created by the data protection engine 208 of the backup scheduling and management engine 110. The short-lived native backups may be temporary snapshots or copies of data created in the native format or environment of the source system. In some implementations, the short-lived native backup may be configured to exist for a relatively brief period, typically just long enough to facilitate the backup process.

The short-lived native backup may be created rapidly within the source system environment. In some implementations, the short-lived native backup may capture the current state of data without requiring relatively significant processing or transformation. In some implementations, the short-lived native backup may exist for the duration, which may be appropriate to extract or transfer relevant information to a more permanent backup storage. In some implementations, the short-lived native backup may be automatically deleted or discarded once a purpose of the short-lived native backup in the backup process is fulfilled.

In some aspects, short-lived native backups may serve as an intermediary step between the live data and the final backup destination. The short-lived native backups may allow differential comparisons and data extraction without a relatively prolonged impact on the source system performance or storage capacity.

The backup system 100 may involve multiple entities which may have relatively distinct roles. In some implementations, these entities may include a backup entity, a backup provider, and a backup manager. The backup entity may be the source of data being backed up, which may be managed by the client backup manager 130. The backup provider may supply the necessary resources for performing backups, potentially represented by the backup store manager 140 and its components such as the object storage repository 226. The backup manager, which may be associated with the data protection engine 208, may oversee and coordinate the backup process. In some aspects, two or more of these roles may be fulfilled by the same entity within the backup scheduling and management engine 110, allowing for flexibility in configuration and deployment of the backup system 100. For example, the policy management engine 202, scheduling engine 204, and inventory management engine 206 may work together to fulfill multiple roles in managing the backup process.

In some implementations, when the backup scheduling and management engine 110 initiates a backup process, the data protection engine 208 creates a transient backup (e.g., TB1a) in the client cloud account (e.g., using APIs of cloud service providers such as AMAZON WEB SERVICES (AWS) and/or MICROSOFT AZURE). This transient backup (e.g., TB1a) may capture the point-in-time state of the client asset.

Point-in-time data may be a snapshot or representation of data as the data exists at a specific moment in time. In some implementations, point-in-time data captures the state of information within a system, database, or storage device at a a particular moment of time.

Point-in-time data may represent the state of data when a backup operation is initiated or completed. Using point-in-time data may allow for the restoration of data to a specific moment in the past, which may allow maintaining data integrity and provide recovery from various failure scenarios.

In some aspects, point-in-time data may include the following: the content of files and databases at the specified moment; metadata associated with the data, such as timestamps, file permissions, and/or ownership information; system state information, including configuration settings and/or registry data. In some cases, point-in-time data may allow for the analysis of data evolution and the ability to revert to previous states when it may be appropriate.

In backup systems, the creation and management of point-in-time data may involve various techniques such as full backups, incremental backups, and/or relatively continuous data protection mechanisms. Factors such as the nature of the data, the frequency of changes, and the recovery point objectives may impact structure of point-in-time data.

In some implementations, the transient backups TB1a and TB2a serve as intermediary snapshots between the client live data and the air-gapped cloud backups. The transient backups TB1a and TB2a may allow the backup system 100 to perform differential checks potentially without directly accessing the client live data, reducing impact on production systems.

In some implementations, the comparison engine 210 communicates with the data protection engine 208 to perform differential data checks. As an example, when a backup request 216 is received, the data protection engine 208 communicates with the comparison engine 210. In some implementations, the comparison engine 210 uses cloud service provider APIs, such as AWS and/or AZURE-specific APIs, to compare the current state of the data (represented by the transient backup TB2a) with the previous backup state (represented by the transient backup TB1a).

The cloud service provider APIs may allow the backup system 100 to perform various operations related to backup and data management. In some implementations, the client backup manager 130 may use the cloud service provider APIs to perform tasks such as comparing data states, identifying changed blocks, or retrieving information about modifications between backup points-in-time.

In some implementations, such as for an AWS API, the comparison engine 210 may use the "ListChangedBlocks" API for elastic block store (EBS) volumes or similar APIs for other AWS services. Such APIs may return information about which blocks have changed between two specified points in time, potentially without actually retrieving the block data itself.

In some implementations, such as for an AZURE API, the comparison engine 210 may use the "ListChangedRanges" API for managed disks or equivalent APIs for other AZURE services. This API may provide a list of changed ranges between two binary large object (blob) snapshots or page blob snapshots.

In some implementations, the comparison engine 210 processes the response from the APIs, which typically includes a list of block identifiers or ranges that have changed, rather than the actual data within those blocks. In some implementations, this information is then communicated back to the data protection engine 208.

In some implementations, while the backup system 100 compares blocks of data to identify changes between the transient backups TB1a and TB2a, the backup system 100 may also be configured to compare the actual data content. For example, the comparison engine 210 may be configured to perform byte-level or file-level comparisons in addition to or instead of block-level comparisons.

If no changes are detected, the data protection engine 208 can proceed with incrementing the reference counter for the previous transient backup TB1a potentially with little-to-no involvement of the backup store manager 140 and/or potentially without initiating a data transfer to the object storage repository 226. If changes are detected, the data extraction engine 220 within the backup store manager 140 can be instructed to retrieve the changed blocks, and potentially only the changed blocks, possibly reducing data transfer and processing time.

In some implementations, the transient backups TB1a and TB2a are temporary and may be deleted once the air-gapped cloud backup process is complete. In some implementations, the air-gapped cloud backups corresponding to the transient backups TB1a and TB2a, may be managed by the backup store manager 140, retained for longer periods, and may be stored, e.g., in the object storage repository 226.

In some implementations, the air-gap implementation engine 228 allows the air-gapped cloud backups to be isolated from the client live environment, providing an additional layer of protection against threats such as ransomware. In some implementations, when multiple transient backups are taken with no changes (e.g., transient backups TB1a, TB2a, TB3a (e.g., in FIG. 4A, described below) match according to an applicable standard), the backup system 100 may maintain a chain of references, e.g., a database entry B3b (e.g., in FIG. 4B, described below) references the database entry B2b, which in turn references the database entry B1b, which may correspond to the first transient backup TB1a corresponding to a first air-gap cloud backup. In some implementations, the chain of references allows efficient storage and a relatively quick access to backup data potentially without duplicating unchanged data.

The storage 120 may include a database maintained by the backup scheduling and management engine 110 to store and manage information related to backup operations. This storage 120 may store backup policies and schedules defined by users or administrators; inventory of client assets, for which a backup may be appropriate; metadata about existing backups, including timestamps, asset identifiers, and storage locations; reference counts for backups to track dependencies between backup entries; information about transient backups (e.g., TB1a and TB2a) and their relationships to air-gapped cloud backups; status information for ongoing and completed backup operations; flags and indicators for managing backup parent-child relationships; and other suitable data.

As an example, the storage 120 includes several tables or collections such as backup entries tables, reference counter tables, and relationship tables. In some implementations, the backup entries table stores individual backup records. In some implementations, each entry in the backup entries table may include, e.g., a unique backup ID, a timestamp, asset information (e.g., AWS and/or AZURE resource identifier), a backup type (e.g., full or incremental backup), a storage location (e.g., a pointer to object storage repository 226), and/or a reference to the parent backup.

In some implementations, the reference counter table manages reference counters for each backup (e.g., the transient backups TB1a and TB2a and/or corresponding air-gapped backups). In some implementations, the reference counter table maintains a count for each backup entry (e.g., the database entries B1b and B2b). In some implementations, when a new backup TB2a references an existing backup TB1a (due to no changes), the reference counter is incremented. In some implementations, the data protection engine 208 updates this count when creating a new transient backup TB2a that references an existing transient backup TB1a or when deleting a backup TB2a that references another backup TB1a.

In some implementations, the relationship table tracks parent-child relationships between transient backups (e.g., the transient backups TB1a and TB2a). In some implementations, the relationship table tracks the hierarchical structure of transient backups, stores pairs of transient backup IDs (e.g., parent ID, child ID). In some implementations, this allows the backup system 100 to trace a parent-child relationship of the transient backup.

In some implementations, the data protection engine 208 queries the storage 120 when determining if a new backup TB2a should reference an existing backup TB1a or when resolving restore requests to find the appropriate backup data. In some implementations, updates of the storage 120 occur during backup creation, deletion, and when the reference counter is updated.

In some implementations, when the client backup manager 130 reports no changes between transient backups (e.g., the transient backups TB1a and TB2a), a new logical database entry B2b is created in the database entries table in the storage 120, the database entry B2b in the database entries table in the storage 120 points to the parent backup data (e.g., the data of the parent transient backup TB1a), and the reference counter of the parent backup TB1a is incremented.

In some implementations, when a second air-gapped backup corresponding to the transient backup TB2a is marked for deletion, the transient backup TB2a is deleted if its reference counter is zero and transient backup TB2a is not a parent. In some implementations, if the first air-gapped backup corresponding to the transient backup TB1a marked for deletion has child backup(s), the first air-gapped backup is marked as "do_not_list" and the backup TB1a marked for deletion might still be retained.

In some implementations, during a restore operation, the storage 120 is queried to locate the requested backup and traverse the parent-child chain to reconstruct full backup data. In some implementations, the storage 120 may be improved for relatively quick lookups and updates. In some implementations, the storage 120 may use indexing on relatively frequently queried fields such backup ID and timestamps.

In some implementations, the inventory management engine 206 may use the storage 120 to track backed-up assets. In some implementations, the scheduling engine 204 may communicate with the storage 120 to improve backup schedules based on the data change frequency. In some aspects, the backup system 100 may include additional features and capabilities. As an example, the backup system 100 may involve deduplication techniques to improve storage utilization. Deduplication techniques may identify and eliminate or reduce redundant data blocks, thereby reducing the amount of data to be stored and transferred during backup operations. Such approach may be implemented in the backup store manager 140, specifically in the object store engine 222, which may be configured to convert the data into block size, deduplicate the data, and store it in the object storage repository 226.

In some implementations, when the data protection engine 208 initiates a transient backup (e.g., the transient backup TB1a or TB2a), the client backup manager 130 captures the backup data. In some implementations, the data extraction engine 220 processes the backup data before communicating the backup data to the object store engine 222.

In some implementations, the object store engine 222 divides the backup data into smaller blocks. In some implementations, for each data block, a unique hash is calculated. In some implementations, the object store engine 222 compares each data block hash against existing blocks in the object storage repository 226. In some implementations, if a matching hash is found, the matching hash indicates the block already exists in the object storage repository 226.

In some implementations, for new, unique blocks, the object store engine 222 stores the block in the object storage repository 226. In some implementations, a new entry is created in a deduplication table, corresponding the block hash to its storage location. In some implementations, for duplicate blocks, instead of storing the block again, a reference to the existing block is created.

In some implementations, the object store engine 222 creates a metadata file for the transient backup (e.g., for the transient backup TB1*a* or TB2*a*), which may include references to some and potentially all of the blocks (e.g., both new and existing) that are included in the transient backup (e.g., transient backup TB1*a* or TB2*a*). In some implementations, information about the logical structure of the transient backup may be included in the metadata file for the transient backup.

In some implementations, when a new transient backup references existing blocks, the data protection engine 208 increments the reference counter for each reused block in the deduplication table. In some implementations, this reference counter is separate from, and complementary to, the backup-level reference counter managed by the data protection engine 208 in the storage 120.

In some implementations, if the client backup manager 130 detects no changes between the transient backups TB1*a* and TB2*a*, the data protection engine 208 creates a new logical backup database entry B2*b* in the storage 120. In some implementations, the database entry B2*b* points to the same set of blocks as the previous backup TB1*a*. In some implementations, the backup-level reference counter is incremented, but the block-level reference counts remain substantially unchanged.

In some implementations, when the data protection engine 208 initiates a backup deletion, the data protection engine 208 decrements the backup-level reference counter in the storage 120. In some implementations, if the transient backup (e.g., the transient backup TB2*a*) is fully deleted (e.g., if the reference counter reaches zero and there is no "do_not_list" flag, which indicates that a backup should be logically removed from view potentially without physically deleting it), then the data protection engine 208 decrements the reference counter for each block used by that transient backup TB2*a*. In some implementations, blocks which reference counter reaches zero are marked for potential removal from the object storage repository 226.

In some implementations, the backup store manager 140 may run a cleanup process to remove blocks with a reference counter having a value of zero (0) from the object storage repository 226. In some implementations, the backup store manager 140 may consolidate partially filled storage containers to improve storage space usage.

In some implementations, during a restore operation, the data protection engine 208 retrieves the backup metadata file. In some implementations, the data extraction engine 220 uses this metadata to locate and retrieve the appropriate blocks from the object storage repository 226. In some implementations, the blocks are reassembled to reconstruct the original backup data.

In some implementations, for incremental transient backups (e.g., the transient backup TB2*a*), only new or changed blocks are processed for deduplication. In some implementations, the metadata file references a combination of new blocks and existing blocks from the previous transient backups (e.g., the transient backup TB1*a*). In some implementations, the deduplication process works across some or all backups in the backup system 100. As an example, identical blocks may be shared within a backup chain and across different assets and clients.

In some cases, the backup system 100 may support various asset types across different cloud platforms. The inventory management engine 206 may manage an inventory of client assets, which may include a wide range of asset types such as AWS volumes, AWS machine instances, elastic Kubernetes service persistent volumes, AZURE managed disks, AZURE virtual machines, MICROSOFT OFFICE 365, and remote desktop service database backups. Such support for various asset types makes the backup system 100 applicable for diverse enterprise backup solutions.

In addition to scheduled backups, the backup system 100 may also handle on-demand backups. The on-demand backups may be triggered by a user at any time, independent of the predetermined backup schedule. The backup scheduling and management engine 110 may receive an on-demand backup request and initiate the backup process accordingly. Such relative flexibility in backup scheduling allows a responsive data protection to satisfy, at least partially, the dynamic needs of the users.

In some implementations, the backup system 100 may handle zero change-set data in on-demand backups. Similar to the scheduled backups, if the client backup manager 130 detects no changes in the data since the last on-demand backup, the backup scheduling and management engine 110 may create a reference to the previous backup and increment a reference count, thereby avoiding or reducing unnecessary data transfers and storage.

In some implementations, the scheduling engine 204 allows the backup system 100 to dynamically adjust backup schedules based on detected data change rates. In some implementations, the client backup manager 130 tracks the rate of data changes between the transient backups (e.g., the transient backups TB1*a* and TB2*a*). In some implementations, the scheduling engine 204 analyzes this change rate data over time.

In some implementations, based on the analysis, the scheduling engine 204 may increase backup frequency for assets with high change rates or decrease frequency for assets with low change rates. In some implementations, the policy management engine 202 allows these adjustments to align with overall backup policies.

In some implementations, this adaptive approach helps optimize resources of the backup system 100 by reducing unnecessary backups for relatively static data and allowing adequate protection for rapidly changing data. In some implementations, the data protection engine 208 provides feedback on backup efficiency, allowing relatively continuous refinement of the scheduling algorithm.

Figure 3:
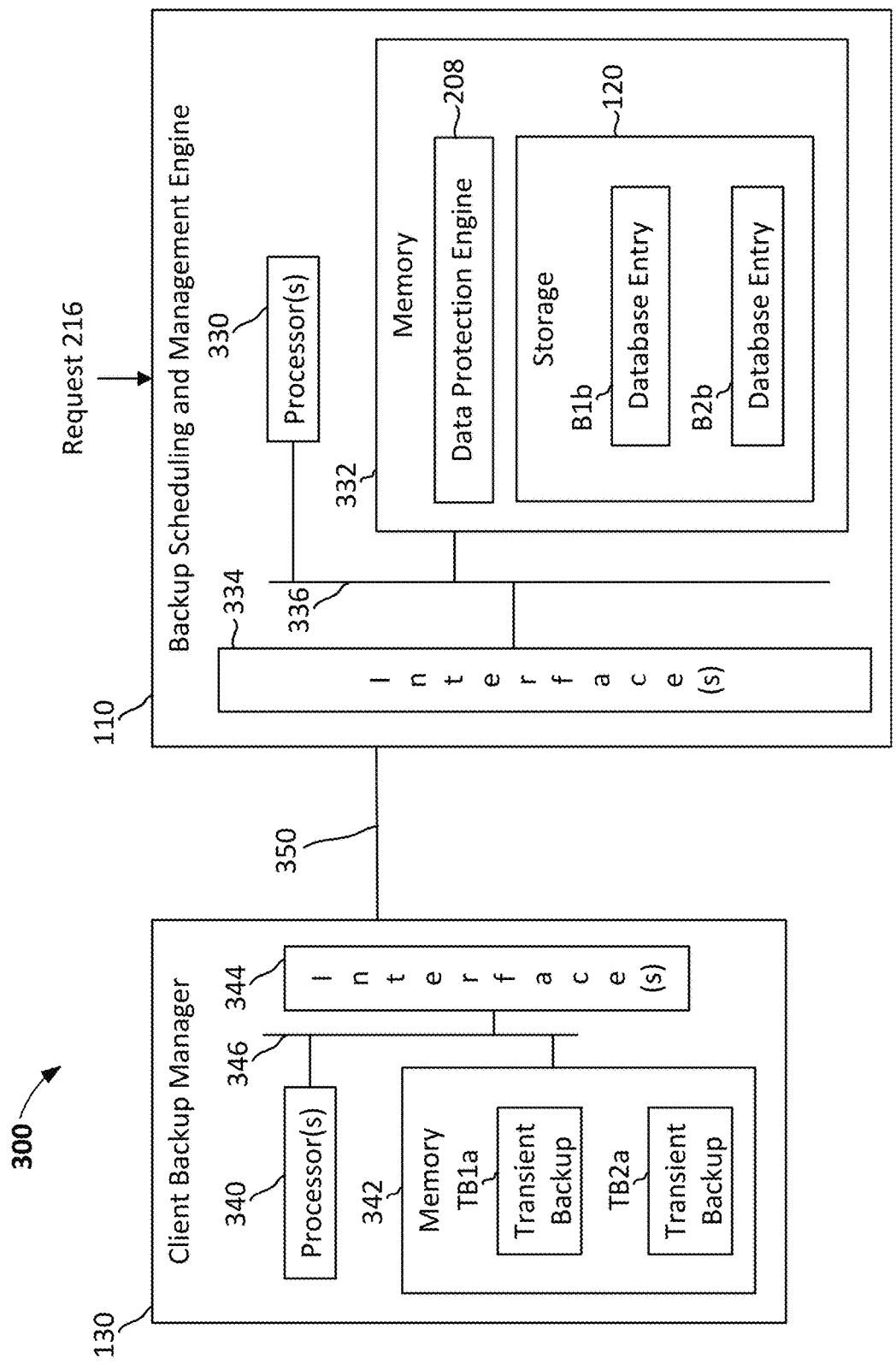
FIG. 3 illustrates additional details of a client backup manager and backup scheduling and management engine, along with additional details related to operation of client backup manager and backup scheduling and management engine, according to certain implementations.

FIG. 3 illustrates additional details of a client backup manager 130 and the backup scheduling and management engine 110, along with additional details related to operation of the client backup manager 130 and backup scheduling and management engine 110, according to certain implementations. In the illustrated example, client backup manager 130 includes one or more processors 340, memory 342, and one or more interfaces 344, all of which may communicate using one or more communication links 346.

The processor 340 may be any component or collection of components adapted to perform computations and/or other processing-related tasks. The processor 340 can be, for example, a microprocessor, a microcontroller, a control circuit, a digital signal processor, a field-programmable gate array (FPGA), an application-specific integrated circuit (ASIC), a system-on-chip (SoC), or combinations thereof. The processor 340 may include one or more processing cores. The processor 340 may include any suitable number of processors, or multiple processors may collectively form a single processor 340.

The memory 342 may include any suitable combination of volatile memory, non-volatile memory, and/or virtualizations thereof. For example, the memory 342 may include any suitable combination of magnetic media, optical media, RAM, ROM, removable media, and/or any other suitable memory device. The memory 342 may include data structures used to organize and store all or a portion of the stored data. The memory 342 may include a non-transitory computer-readable medium that stores programming for execution by one or more of the one or more processors 340.

The interfaces 344 represent any suitable computer element that can receive information from a communication link 350 and transmit information through the communication link 350, or both. The interfaces 344 represent any port or connection, real or virtual, including any suitable combination of hardware, firmware, and software, including protocol conversion and data processing capabilities, to communicate through a LAN, WAN, or other communication system that allows information to be exchanged. The interfaces 344 may facilitate wireless and/or wired communication. In certain implementations, at least one of the interfaces 344 is configured to communicate through a wired communication link 350 to backup scheduling and management engine 110.

The communication links 346 may include any suitable wired or wireless communication medium for the components of the client backup manager 130 to communicate with one another. For example, the communication links 346 may include any suitable combination of a bus or communication network.

Turning to the backup scheduling and management engine 110, in the illustrated example, the backup scheduling and management engine 110 includes one or more processors 330, a memory 332, and one or more interfaces 334. These components may communicate using one or more communication links 336.

The processor 330 may be any component or collection of components adapted to perform computations and/or other processing-related tasks. The processor 330 can be, for example, a microprocessor, a microcontroller, a control circuit, a digital signal processor, an FPGA, an ASIC, an SoC, or combinations thereof. The processor 330 may include one or more processing cores. The processor 330 may include any suitable number of processors, or multiple processors may collectively form a single processor 330.

The memory 332 may include any suitable combination of volatile memory, non-volatile memory, and/or virtualizations thereof. For example, the memory 332 may include any suitable combination of magnetic media, optical media, RAM, ROM, removable media, and/or any other suitable memory device. The memory 332 may include data structures used to organize and store all or a portion of the stored data. The memory 332 may include a non-transitory computer-readable medium that stores programming for execution by one or more of the one or more processors 330.

The interfaces 334 represent any suitable computer element that can receive information from a communication link 350 and transmit information through a communication link 350, or both. The interfaces 334 represent any port or connection, real or virtual, including any suitable combination of hardware, firmware, and software, including protocol conversion and data processing capabilities, to communicate through a LAN, WAN, or other communication system that allows information to be exchanged. The interfaces 334 may facilitate wireless and/or wired communication. In certain implementations, at least one of interfaces 334 is configured to communicate through a wired communication link 350 to the client backup manager 130.

The communication links 336 may include any suitable wired or wireless communication medium for the components of backup scheduling and management engine 110 to communicate with one another. For example, the communication links 336 may include any suitable combination of a bus or communication network.

In some implementations, the client backup manager 130 and the backup scheduling and management engine 110 interact through their respective interfaces 344 and 334, e.g., via the communication link 350. In some implementations, the client backup manager 130 compares the transient backups TB1a and TB2a and stores the comparison results in the memory 342.

In some implementations, the storage 120 of the backup scheduling and management engine 110 can maintain the corresponding database entries B1b and B2b. The memory 332 may include the data protection engine 208, which may coordinate the backup operations and manage the scheduling and execution of backup tasks.

In some implementations, the workflow involves the policy management engine 202 receiving backup requests 216, which may then be processed through the scheduling engine 204 and the inventory management engine 206. The data protection engine 208 may communicate with the client backup manager 130 through the communication interfaces 334 and 344 to execute the backup operations.

In some implementations, when backup operations are initiated, the processor(s) 330 in the backup scheduling and management engine 110 communicate with the processor(s) 340 in the client backup manager 130 to arrange the creation and management of the transient backups TB1a and TB2a. These operations are performed using through their respective interfaces 334 and 344 over the communication link 350, where all components being interconnected through internal communication links 336 and 346 within the client backup manager 130 and the backup scheduling and management engine 110, respectively.

The memory 332 of the backup scheduling and management engine 110 may include the data protection engine 208 which uses the database entries B1b and B2b stored in storage 120, allowing tracking and management of the backup operations.

Figure 4A:
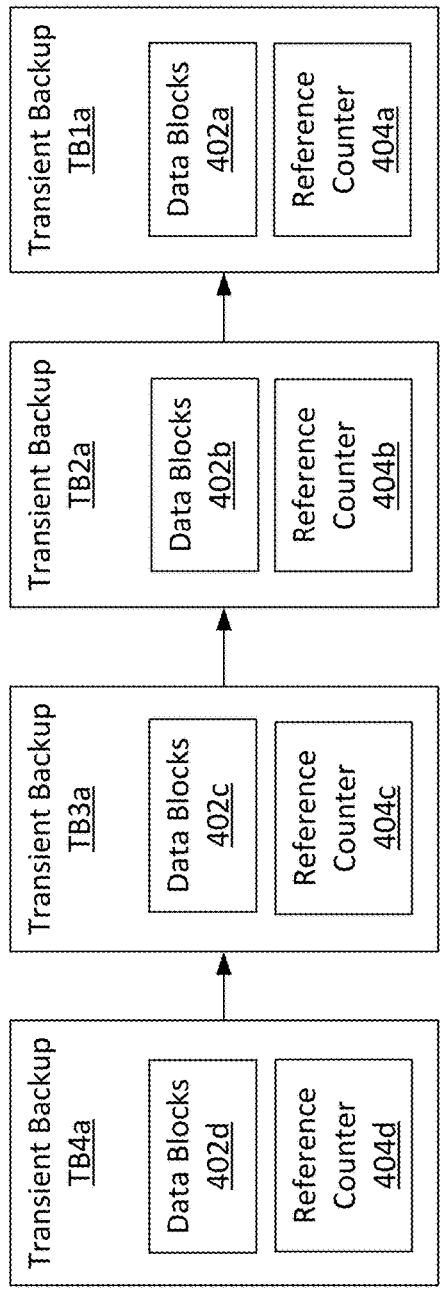
FIG. 4A illustrates a sequence of backup events performed by a backup system, according to some implementations.

FIG. 4A illustrates a sequence of backup events performed by backup systems 100 and 300, according to some implementations. As an example, FIG. 4A includes a series of transient backups TB4a, TB3a, TB2a, and TB1a. In some implementations, each transient backup includes data blocks (402d, 402c, 402b, and 402a, respectively) and reference counters (404d, 404c, 404b, and 404a, respectively). Referencing relationships may indicate that each backup may point to the preceding transient backup TB4a, TB3a, TB2a, and TB1a when no changes are detected in the underlying data.

In some implementations, the data blocks 402a-402d represent point-in-time snapshots of backup data. For example, the data blocks 402a in TB1a may include the original full backup data. In some implementations, the data blocks may contain metadata, pointers, or other representations of the backup data. In some implementations, subsequent data blocks 402b-402d may reference previous data blocks when no changes have occurred.

In some implementations, each transient backup includes a reference counter 404a-404d that may represent how many other backups are referring to it. For instance, a reference counter 404a in the transient backup TB1a may have a higher count as it is referenced by subsequent transient backups (e.g., the transient backups TB2a, TB3a, and TB4a), while reference counter 404d in the transient backup TB4a may have a lower count or zero (0) as it is the most recent backup.

Figure 4B:
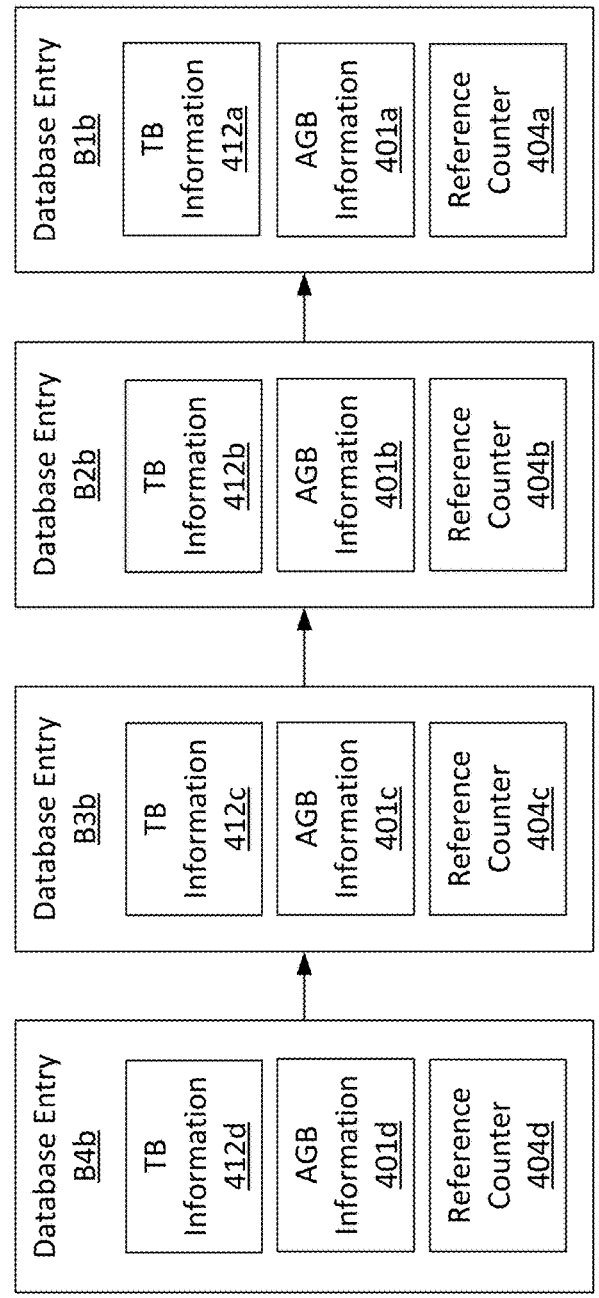
FIG. 4B illustrates database entries for the backup events of the sequence of the backup events shown in FIG. 4A, according to some implementations.

FIG. 4B illustrates database entries for the backup events of the sequence of the backup events shown in FIG. 4A, according to some implementations. As an example, FIG. 4B illustrates an implementation of the transient backups in the database of the storage 120. In some implementations, each transient backup TB4a, TB3a, TB2a, and TB1a has a corresponding database entry B4b, B3b, B2b, and B1b. These entries may include substantially the same logical relationship structure as shown in FIG. 4A, but they may implement the storage operations differently.

In some implementations, each database entry B4b, B3b, B2b, and B1b includes transient backup (TB) information 412d, 412c, 412b, and 412a, air-gapped backup (AGB) information 401d, 401c, 401b, and 401a, and corresponding reference counters 404d, 404c, 404b, and 404a. In some implementations, the AGB information 401a-401d may represent air-gapped backup information corresponding to each database entry B1b-B4b, respectively. The AGB information 401a-401d may include various details associated with each air-gapped backup and a corresponding transient backup.

In some implementations, the AGB information 401a-401d may include metadata about the air-gapped backup, such as the location of the backup, the date and time the air-gapped backup was created, and the method used to create the air-gap. This information may be used for retrieving and restoring data from the air-gapped backup.

As an example, the AGB information 401a-401d may include details about the isolation mechanism used for each air-gapped backup. Such information may include information about the physical separation (e.g., offline storage media) or logical separation (e.g., network segmentation) used to create the air-gap. Such information may be used for maintaining the integrity of the air-gapped backups and providing the backup availability in case of a security breach or data loss event.

In some aspects, the AGB information 401a-401d may store encryption keys or references to encryption keys used to secure the air-gapped backup data. This approach may allow the backup systems 100 and 300 to maintain a relatively high level of security for the backed-up data while allowing an appropriate authorized access.

The AGB information 401a-401d may include verification data that can be used to confirm the integrity of the air-gapped backup. The verification data may include checksums, hash values, or other cryptographic proofs that may be used to detect tampering or corruption of the air-gapped backup data.

In certain implementations, the AGB information 401a-401d may include retention policies specific to each air-gapped backup. The retention policies may provide information how long the air-gapped backup may be retained, when the air-gapped backup may be safely deleted, and/or any special handling instructions for long-term storage and/or archival purposes.

In some implementations, the transient backup information components store metadata and management information about each transient backup, rather than the air-gapped backup data. For example, transient backup information 412d, 412c, 412b, and 412a may include details such as: asset identification information, backup scheduling parameters, status indicators, timestamps, policy information, and/or cloud backup references.

In some implementations, the reference counters 404a-404d in the database entries 404a-404d may be used for tracking dependencies between backups and managing their lifecycle. The reference counters 404a-404d may be used to determine when a backup can be safely deleted potentially without affecting other backups that may reference it.

The backup systems 100 and 300 may use the AGB information 401a-401d along with the TB information 412a-412d to provide a relatively comprehensive view of each backup, including the transient and/or air-gapped aspects. This combined information may allow for efficient management of backups across different storage tiers and security levels, allowing relatively fast recovery and data protection strategies.

In some implementations, the database entries 404a-404d may have referencing relationships similar to those shown in FIG. 4A, representing actual database references. For example, when the database entry B4b references the database entry B3b, this indicates that transient backup information 412d includes references to the information stored in transient backup information 412c, rather than duplicating that information.

The reference counters 404a-404d may facilitate management of the lifecycle of backups. For instance, if reference counter 404a in B1b has a value greater than zero, this indicates that at least one other backup entry is referencing B1b. The backup systems 100 and 300 may use these counter values to prevent deletion of the database entries that remain referenced. When a backup database entry is deleted, the backup systems 100 and 300 may decrement the reference counter of the database entry that the other database entry references. In some implementations, a backup database entry cannot be fully deleted from the database until its reference counter reaches zero meaning that no other entries depend on it.

In some implementations, backup operations may be mapped in the following way. When a new backup is requested, a sequence of the backup events (illustrated in FIG. 4A) may show a new backup (e.g., TB4a) with corresponding data blocks (402d). In some implementations, the backup systems 100 and 300 may have reference relationship to previous backup (e.g., TB3a). In some implementations, the backup systems 100 and 300 may indicate a reference counting state.

Correspondingly, when a new backup is requested, the backup systems 100 and 300 may create a new database entry (e.g., the database entry B4b in FIG. 4B). In some implementations, the backup systems 100 and 300 may populate transient backup information 412d, e.g., asset metadata, policy information, status indicators, and/or reference links if no changes detected between the previous transient backup TB3a (and, consequently, TB2a and TB1a) and the current backup TB4a. In some implementations, the data protection engine 208 updates the reference counters 404a-404d in the referenced database entries B1b-B4b.

In some implementations, when a request is made to delete an air-gapped backup, the sequence of the backup events (illustrated in FIG. 4A) shows the removal of a target air-gapped backup that is flagged for deletion. This target air-gapped backup corresponds to the transient backup, such as transient backup TB4a, and its data blocks, such as the data blocks 402d. The backup systems 100 and 300 may update the reference counters, such as the reference counters 404a-404d, and maintains reference chain integrity.

In some implementations, when a backup deletion is requested, the backup systems 100 and 300 may check a reference counter, e.g., the reference counter 404d of a target entry (that is flagged for deletion), e.g., the database entry B4b; manage the database entry visibility (e.g., visibility of the database entry B4b); update reference counters, e.g., the reference counters 404a-404d in referenced database entries, e.g., B1b-B4b; and maintain reference chain integrity through updating transient backup information, e.g., the transient backup information 412a-412d.

In operation, when a new backup is initiated, the backup systems 100 and 300 may first create a corresponding database entry (e.g., the database entry B4b). The backup systems 100 and 300 may then compare the current backup data blocks with those of the previous backup (e.g., comparing TB4a data blocks 402d with TB3a data blocks 402c). If no changes are detected, rather than creating a new set of data blocks, the transient backup information 412d in the database entry B4b may reference the existing data blocks through the database entry B3b, and the reference counter 404c in the database entry B3b may be incremented.

In some implementations, the backup systems 100 and 300 may provide the following advantages: redundant storage of unchanged data may be eliminated, backup dependencies may be identified through reference counters, tracking references between backups may allow safe deletion management, and/or backup metadata may be accessed efficiently through transient backup information components.

In some implementations, the backup creation process may be illustrated by the sequence of the database entries from B1b to B4b in FIG. 4B. When the backup systems 100 and 300 may detect that a new air-gapped backup (e.g., corresponding to the transient backup TB4a) is instructed to be created according to policy or user request, the backup systems 100 and 300 may first create a new database entry containing transient backup information 412d. The transient backup information (e.g., 412a-412d) may include metadata such as backup scheduling parameters, asset identification details, and/or status indicators.

The reference counter 404d in the new database entry (e.g., the database entry B4b) may initially be set to zero (0), as no other backups reference it. In some implementations, if the new backup (e.g., the transient backup TB4a or it corresponding air-gapped backup) references an earlier backup due to unchanged data, the backup systems 100 and 300 may increment the reference counter of the referenced backup. For example, if the database entry B4b references the database entry B3b, the reference counter 404c in the database entry B3b may be incremented.

The backup systems 100 and 300 may maintain the reference chain shown by the arrows in FIG. 4B to track the relationships between the backups. The reference chain may be used during deletion operations. For instance, if a request is made to delete the transient backup TB2a, the backup systems 100 and 300 may check the reference counter 404b to determine if any later backups reference the transient backup TB2a. In some implementations, if the reference counter is non-zero, the database entry is marked as hidden while maintaining the reference chain. In some implementations, the reference counter of any backup that the transient backup TB2a references may be decremented (e.g., the reference counter 404a of the transient backup TB1a may be decremented). In some implementations, the referencing information in the transient backup information 412b may be updated to maintain reference chain integrity.

The transient backup information components 412a-412d may store different types of metadata depending on their status in the backup reference chain. In some implementations, for the first backup TB1a, the transient backup information 412a may include relatively complete information about the initial backup state. For the subsequent backups TB2a-TB4a, the transient backup information 412b-412d may contain references to previous backup data if no changes detected; differential data information if changes were detected; status of the current backup; timestamps and expiration information; and/or policy and schedule identifiers.

When managing database entries as shown in FIG. 4B, the transient backup information components 412a-412d may include several fields appropriate for backup management. For each database entry B1b-B4b, the transient backup information 412a-412d may include: identification, asset information, client account information, policy and/or schedule identifiers.

As an example, identification may be a unique datastore transient backup ID in the data protection engine 208. In some implementations, asset information may include: cloud service provider region, asset ID, account ID, volume or instance identifiers.

In some implementations, the transient backup information 412a-412d may include status and time information. As an example, the transient backup information 412a-412d may include creation timestamp, expiration timestamp, last update timestamp, current status (e.g., "OK" or "In Progress"), lock status and duration of the lock, and/or point-in-time markers for data consistency.

In some implementations, the transient backup information 412a-412d may include reference information. As an example, the transient backup information 412a-412d may include links to cloud backup IDs, previous backup references, parent backup identifiers when unchanged data is detected, reference state indicators (e.g., "reference_parent_set" flag).

In some implementations, the transient backup information 412d in in the database entry B4b may reference transient backup information 412c in the database entry B3b if no changes (e.g., according to an applicable standard) were detected between the corresponding transient backups. This reference is implemented through database fields rather than duplicating the underlying backup data.

The reference counters 404a-404d and transient backup information 412a-412d may be used to maintain referential integrity. The backup systems 100 and 300 may implement the following logic for reference counting. For initial transient backup (TB1a), the reference counter 404a may track the total number of subsequent backups referring to the database entry B1b. In some implementations, the reference counter 404a increments when new backups reference the database entry B1b. In some implementations, the reference counter 404a decrements when referring transient backups are deleted.

For intermediate backups (e.g., TB2a, TB3a), the reference counters (e.g., 404b, 404c) track both forward and backward references. In some implementations, the reference counter updates proceed through the reference chain. For the latest backup (e.g., TB4a), the reference counter 404d may start at zero (0). In some implementations, the reference counter 404d may increase if subsequent backups are added to the chain. In some implementations, the reference counter 404d may be used to determine if the latest backup may be safely modified or deleted.

In some implementations, the sequence of backup events illustrated in FIG. 4A may correspond to data entries shown in FIG. 4B. As an example, the data blocks 402a-402d in FIG. 4A map to at least some portions of the air-gapped information 401a-401d and/or transient backup information 412a-412d in FIG. 4B. In some implementations, reference relationships may be implemented through database references. In some implementations, reference counters 404a-404d may maintain relatively consistent representation of the backup states in FIG. 4A and FIG. 4B. In some implementations, the client-visible backup states are managed through database entry status fields.

Figure 5:
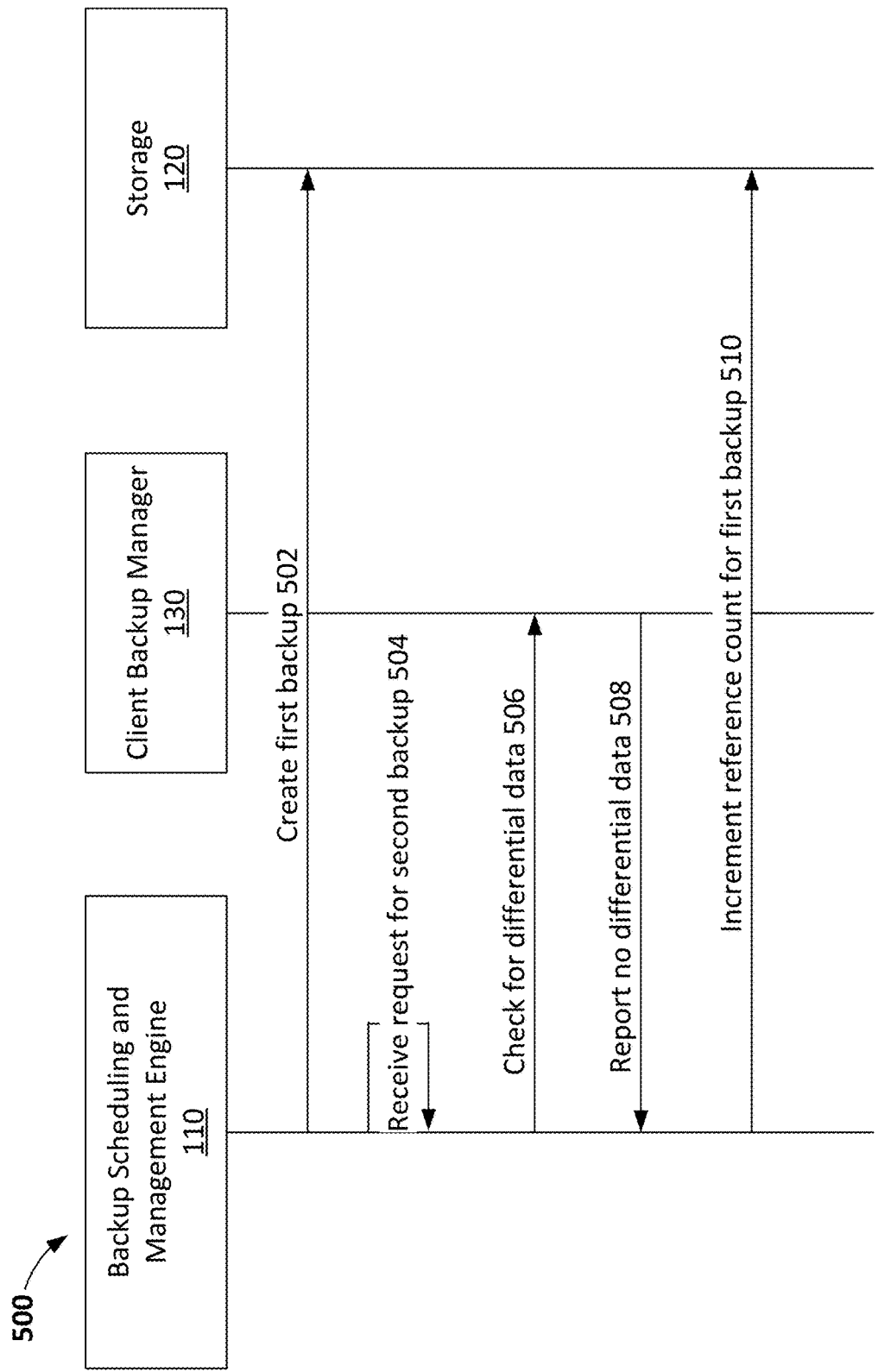
FIG. 5 illustrates an example backup method, according to some implementations.

FIG. 5 illustrates an example backup method 500, according to some implementations. More specifically, the backup method 500 corresponds to the backup of data when there is no differential data between transient backups TB1a and TB2a. The backup method 500 may involve the following components: backup scheduling and management engine 110, client backup manager 130, and storage 120.

The process begins with the client backup manager 130 creating the first database entry B1b, which is created in the storage 120 in step 502. This database entry B1b may correspond to the initial transient backup TB1a corresponding to a first air-gapped backup, which may involve capturing a snapshot of the data at a specific point in time. The client backup manager 130 may use various APIs or methods specific to the client cloud environment (e.g., AWS or AZURE) to create the transient backup TB1a.

Following step 502, the backup scheduling and management engine 110 may receive a request for a second air-gapped backup in step 504. In some implementations, the second air-gapped backup may correspond to the second transient backup TB2a. This request may be triggered by a predetermined schedule or an on-demand user request. The backup scheduling and management engine 110 may log this request and prepare to initiate the backup process.

In some implementations, upon receiving this request, the backup scheduling and management engine 110 initiates a check for differential data by communicating with the client backup manager 130 in step 506. Step 506 may involve the backup scheduling and management engine 110 sending a command to the client backup manager 130 to perform a comparison between the current state of the data (captured by the second transient backup TB2a) and the previous transient backup TB1a. The client backup manager 130 may use cloud-specific APIs (such as AWS's ListChangedBlocks or AZURE's ListChangedRanges) to identify changes between the transient backups TB1a and TB2a potentially without transferring the full data set.

After checking for differential data, the client backup manager 130 may report to the backup scheduling and management engine 110 in step 508 that there is no differential data, indicating that no changes have occurred since the first air-gapped backup (corresponding to the first transient backup TB1a). This report may include metadata about the comparison process and confirmation that no data blocks or ranges between two binary large object snapshots or page blob snapshots have changed.

In response to this information, the backup scheduling and management engine 110 increments the reference counter for the first backup database entry B1b in storage 120 in step 510, rather than creating a new air-gapped or transient backup. This step may involve updating metadata in the backup database of the storage 120 to create a new logical backup database entry B2b that points to the existing backup data corresponding to the previous backup database entry B1b. The reference counter for the original backup entry B1b may be incremented to indicate that multiple backup entries are now relying on this data.

Figure 6:
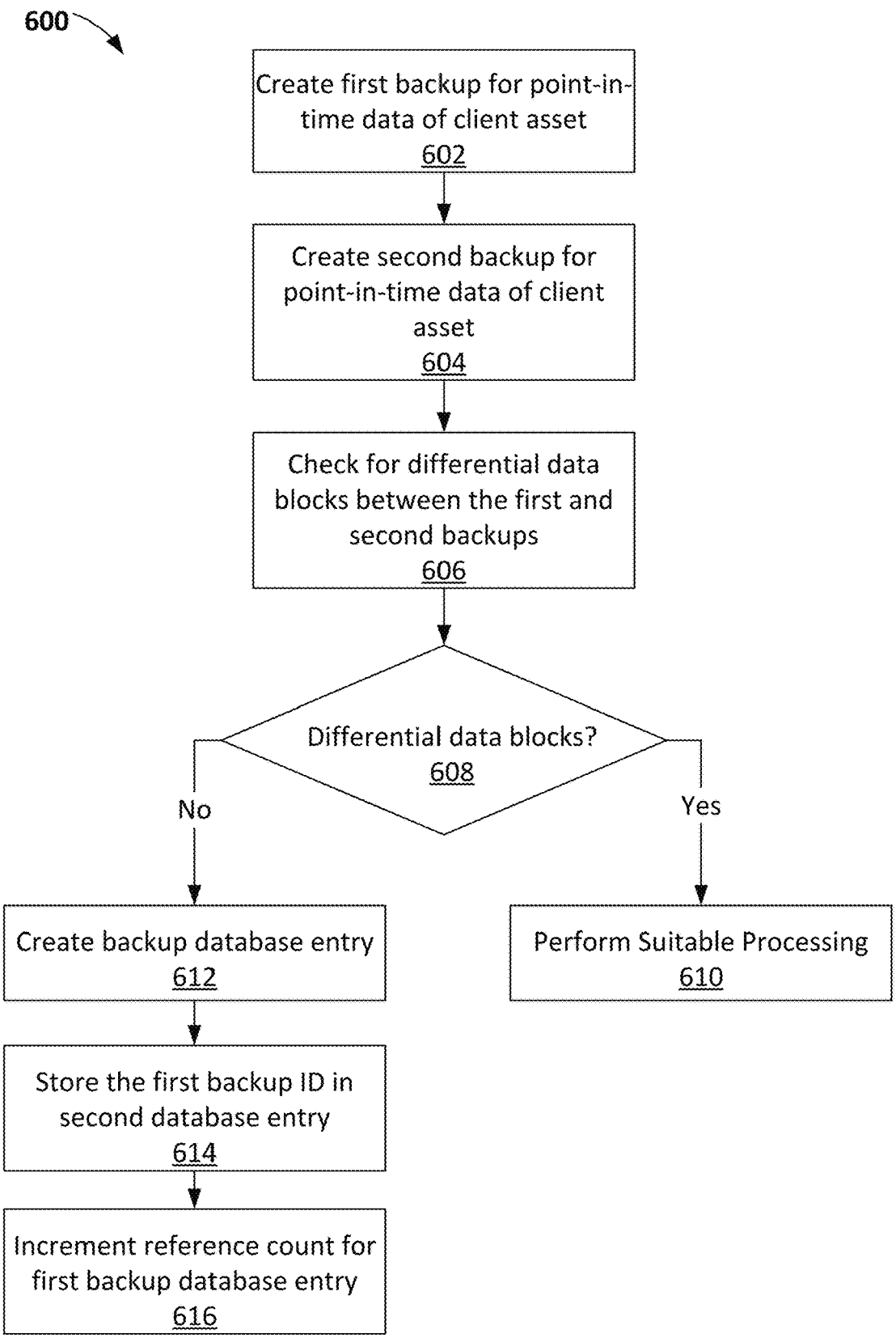
FIG. 6 illustrates an example backup method, according to some implementations.

FIG. 6 illustrates an example backup method 600, according to some implementations. More specifically, a flowchart for a method 600 of managing backups for client assets is illustrated in FIG. 6. The method 600 begins with step 602, where a backup scheduling and management engine 110 creates a first transient backup corresponding to a first air-gapped backup. This first transient backup (e.g., a first transient backup TB1a) may be a short-lived native backup for point-in-time data of a client asset in a client account. The creation of the first transient backup TB1a may involve capturing a snapshot of the current state of the client asset data at a specific point in time.

Following the creation of the first transient backup TB1a, the backup scheduling and management engine 110 may receive a request to create a second transient backup (e.g., a second transient backup TB2a corresponding to a second air-gapped backup) in step 604. This request may be triggered by a predetermined backup schedule or an on-demand request from a user. The second transient backup TB2a may also be a short-lived native backup capturing the state of the client asset data at a later point in time.

In some implementations, the request to create the second transient backup TB2a may involve a direct generation request. As an example, the backup scheduling and management engine 110 may receive a command to generate the second transient backup TB2a. This request may originate from a user interface, an automated scheduling system, or an API call.

The request to create the second transient backup TB2a may involve an indirect generation trigger. In some cases, the request might not explicitly call for backup creation but may trigger a series of events that lead to the generation of the second transient backup TB2a. For example, a system event or policy update may indirectly cause generation of the second transient backup TB2a.

In some implementations, the request to create the second transient backup TB2a may involve scheduled backup execution. As an example, the scheduling engine 204 may interpret a pre-configured backup schedule as a request to generate the second transient backup TB2a at a specified time.

In some implementations, the request to create the second transient backup TB2a may involve policy-driven backup initiation. As an example, the policy management engine 202 may evaluate certain conditions or rules that, when met, result in a request to create the second transient backup TB2a.

In some implementations, the request to create the second transient backup TB2a may involve cascading backup requests. In some implementations, the completion of one backup operation may automatically trigger a request for the next backup in a series, leading to the creation of the second transient backup TB2a.

In some implementations, the request to create the second transient backup TB2a may involve application-specific backup triggers. As an example, certain applications or services integrated with the backup systems 100 or 300 may issue requests to generate backups based on their own internal logic or state changes.

In some implementations, the request to create the second transient backup TB2a may involve delta-based backup requests. As an example, the backup systems 100 or 300 may receive a request to create a backup of the changes since the last full backup, which may result in the generation of the second transient backup TB2a as an incremental or differential backup.

In some implementations, the request to create the second transient backup TB2a may involve cross-system backup coordination. As an example, in distributed or multi-cloud environments, a request from one system component may cause the generation of backups across multiple systems coupled with each other, including generation of the second transient backup TB2a.

In some implementations, the request to create the second transient backup TB2a may involve conditional backup requests. As an example, the inventory management engine 206 may issue requests to create backups based on the state or properties of specific assets in the inventory.

In some implementations, the request to create the second transient backup TB2a may involve user-initiated backups. As an example, the backup systems 100 or 300 may allow users to manually trigger backup creation through a user interface, resulting in a request to generate the second transient backup TB2a.

In some implementations, the request to create the second transient backup TB2a may involve API-driven backup requests. As an example, external systems or scripts may use APIs provided by the backup systems 100 or 300 to programmatically request the creation of new backups, including the second transient backup TB2a.

In some implementations, the request to create the second transient backup TB2a may involve event-driven backup generation. As an example, certain events of the backup system 100 or 300, such as software updates, configuration changes, or security incidents, may automatically trigger requests to create new backups as a precautionary measure.

At step 606, a client backup manager 130 checks for differential data blocks between the first transient backup TB1a and the transient second backup TB2a. Step 606 may involve comparing the data blocks of the first and second transient backups TB1a and TB2a, respectively, to identify whether changes have occurred between the two backups. The differential data blocks represent the changes in the client asset data from the time of the first transient backup TB1a to the time of the second transient backup TB2a.

Step 608 represents a decision point in the method 600. If differential data blocks are found ("Yes" branch), indicating that changes have occurred in the client asset data, the process proceeds to step 610. In step 610, the method 600 performs suitable processing. As an example, in step 610 the method 600 may follow the original backup process, which may involve using backend microservices to extract the changed data blocks and store them in a cloud object store (e.g., in the object storage repository 226).

The original backup process may involve the following operations. In some implementations, the data protection engine 208 initiates the backup process after determining that changes between the first and second transient backups (e.g., between the transient backups TB1a and TB2a) exist.

The data extraction engine 220 may be instructed to identify and extract the specific data blocks that have changed since the previous backup. The extracted changed data blocks may be sent to the object store engine 222 for processing. The object store engine 222 may perform deduplication and compression on the changed data blocks to improve storage usage.

The processed data blocks may be transmitted to the object storage repository 226, which may represent a cloud object store such as AWS SIMPLE STORAGE SERVICE or AZURE blob storage. The virtual management engine 224 may coordinate with the cloud service provider APIs to manage the storage and retrieval of backup data, e.g., in the cloud environment.

The air-gap implementation engine 228 may allow the backup data to be stored in a relatively isolated manner, providing an additional layer of security against potential cyber threats. When the changed data blocks are successfully stored, the data protection engine 208 may update the relevant entries in the storage 120, including the entries in the backup entries table and reference counter table.

The backup store manager 140 may finalize the backup process by confirming the successful storage of the changed data blocks and updating corresponding metadata.

If no differential data blocks are identified ("No" branch of the decision block 608), indicating that no changes have occurred in the client asset data since the first transient backup TB1a, then step 612 follows. In step 612, the backup scheduling and management engine 110 creates the database entry B2b (associated with the second air-gapped cloud backup). The database entry B2b may serve as a reference to the first transient backup TB1a corresponding to the first database entry B1b, thereby avoiding or reducing creation of a new air-gapped backup.

The method 600 includes step 614, where the backup scheduling and management engine 110 increments a reference counter for the first backup database entry B1b in the storage 120. This step maintains the integrity of the backup systems 100 and 300 by tracking the number of references to the first transient backup TB1a. The incremented reference counter indicates that the first transient backup TB1a is being referenced by the second transient backup TB2a.

In some aspects, the restore workflow for the backup systems 100 and 300 might not require modifications because each air-gapped cloud backup database entry may contain a valid air-gapped cloud backup ID. As an example, the backup scheduling and management engine 110 may initiate the restore process upon receiving a restore request (e.g., the backup request 216). The data protection engine 208 may then retrieve the appropriate information from the storage 120, including the air-gapped cloud backup ID associated with the requested backup.

In some cases, the backup store manager 140 may utilize the object store engine 222 to locate and access the appropriate backup data in the object storage repository 226. The air-gapped cloud backup ID may serve as a unique identifier to retrieve the correct air-gapped backup data from the object storage repository 226.

The data extraction engine 220 may then extract the appropriate data from the identified backup. In some implementations, a "reference_parent_set" flag set to "true" may mean that the current backup database entry B2b is referencing a parent transient backup TB1a due to the absence of changes in the data since the previous transient backup TB1a.

The restore workflow may use the valid air-gapped cloud backup IDs stored in each database entry B1b or B2b, regardless of their reference relationships, to facilitate relatively smooth and reliable data restoration.

In some implementations, the extraction process is not dependent on the state of this "reference_parent_set" flag. Whether this flag is set to "true" or "false", the backup systems 100 and 300 may still extract the appropriate data. Each backup database entry B1b or B2b, regardless of whether the backup database entry B1b or B2b corresponds to a full backup or a reference to a parent backup, includes a unique air-gapped cloud backup ID. This air-gapped cloud backup ID allows access to the appropriate data because the air-gapped backup ID allows the backup systems 100 and 300 to locate and retrieve the correct backup data from the object storage repository 226 (e.g., even if the current backup database entry B2b is a reference to a parent transient backup TB1a).

When the data is extracted, the client backup manager 130 may facilitate the restoration of the data to the original or specified location. The interface(s) 344 of the client backup manager 130 may handle the communication between the restored data and the target system, e.g., the original system or client asset from which the backup was initially taken.

Throughout the restore process, the inventory management engine 206 may keep track of the restored assets, allowing the backup system inventory to remain up-to-date. The scheduling engine 204 may also be involved in coordinating the timing of the restore operation to reduce impact on resources of the backup systems 100 and 300.

In some implementations, the air-gap implementation engine 228 may allow the integrity of the air-gapped backup to be maintained during the restore process, providing an additional layer of security for the backed-up data.

When a delete request for a cloud backup is received, the backup scheduling and management engine 110 may retrieve the database entry from the storage 120. This technique may be similar to the original workflow, where the system checks for the existence of the air-gapped backup before proceeding with deletion.

If the retrieved entry has the "reference_parent_set" flag set to "false" in the storage 120 and the reference counter has the value of zero (0), the original delete path may be followed. In this case, the backup store manager 140 may initiate the deletion of the cloud object from the object storage repository 226. This process may involve the data extraction engine 220 and the object store engine 222 removing the air-gapped backup data.

If the backup database entry B2b has "reference_parent_set" set to "true" in the storage 120, it indicates that the air-gapped backup corresponding to the transient backup TB2a references another cloud object (e.g., corresponding to the transient backup TB1a) due to no changes in data between the transient backups TB1a and TB2a. In this scenario, the backup scheduling and management engine 110 may retrieve the database entry for the referenced backup TB1a.

The backup scheduling and management engine 110 may then decrement the reference counter of the referenced transient backup TB1a by one (1). If the value of the reference counter becomes zero (0) after this decrement, no immediate action may need to be taken, as the next deletion request may handle the removal of the transient backup TB1a.

In some cases, a deletion request may be received for a second cloud air-gapped backup corresponding to the database entry B2b with reference counter set to one (1) and "reference_parent_set" flag set to "false". This scenario indicates that the parent transient backup TB1a, which is being referenced by a second air-gapped cloud backup corresponding to the transient backup TB2a, is instructed to be deleted. The backup scheduling and management engine 110 may decrement the reference counter by one (1), making it zero (0). However, the database entry B1b might not be deleted immediately due to the existing reference associated with the database entry B1b. Instead, the backup scheduling and management engine 110 may mark this database entry B1b as "do_not_list." This approach allows the database entry B1b not to be listed, e.g., in a representational state transfer (REST) API calls but continue to exist as long as the database entry B1b is referenced by another transient backup TB2b.

Throughout this process, the client backup manager 130 may communicate with the backup scheduling and management engine 110 to allow the deletion status to be accurately reflected in the client view of the backups. The inventory management engine 206 may update its records to reflect the changes in the backup inventory.

The air-gap implementation engine 228 may maintain the integrity of the remaining air-gapped backups during the deletion process, allowing the deletion of one backup not to compromise the security of other backups. The improved deletion workflow described herein allows the backup systems 100 and 300 to efficiently manage backups with reference relationships, improving storage usage while maintaining data integrity and accessibility for remaining backups.

Figure 7:
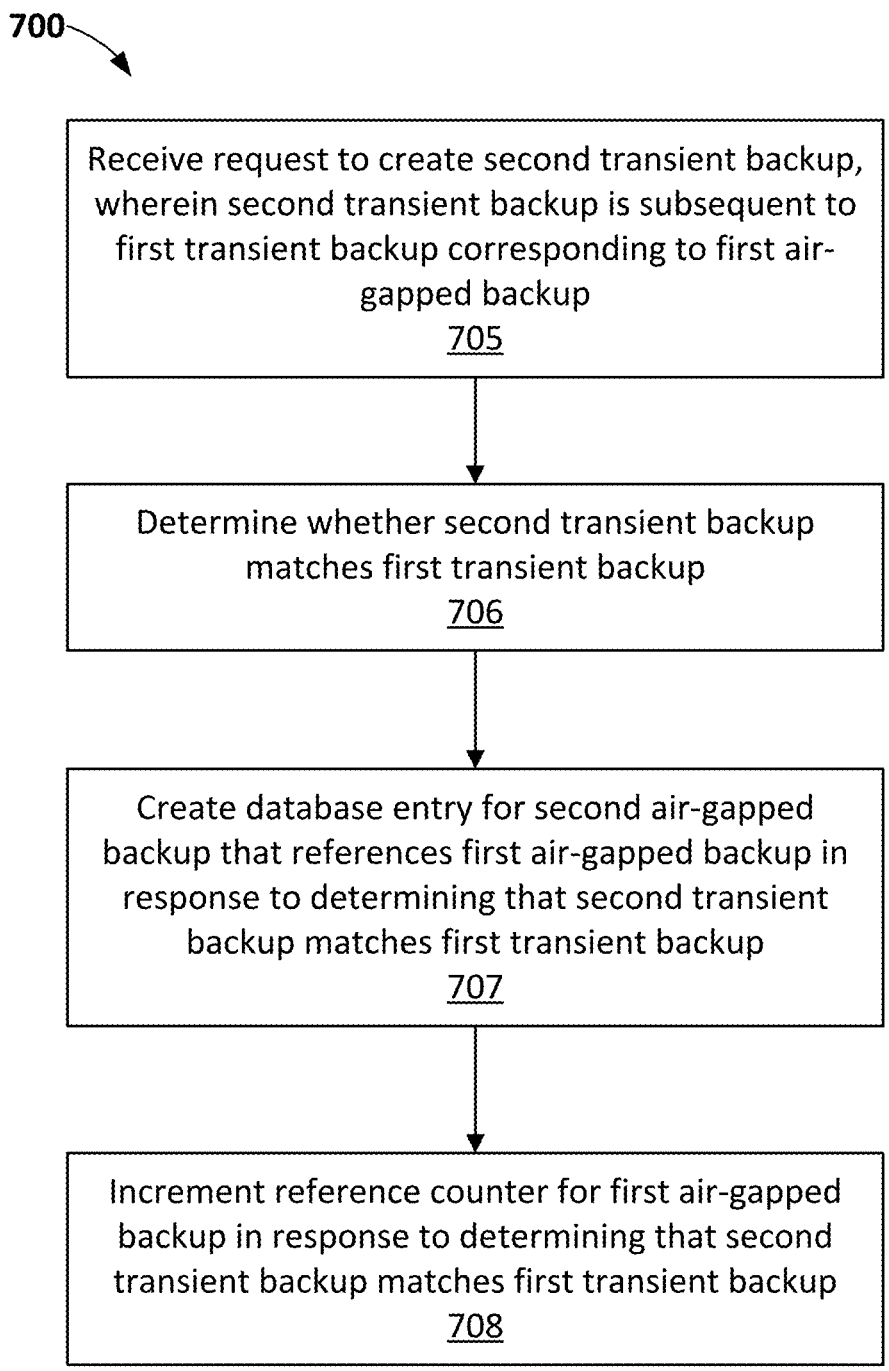
FIG. 7 illustrates an example backup method, according to some implementations.

FIG. 7 illustrates an example backup method 700, according to some implementations. More specifically, a flowchart for the method 700 of managing backups for client assets is illustrated in FIG. 7. In some implementations, one or more method steps of FIG. 7 may be performed by the backup systems 100 and 300.

In some implementations, a backup scheduling and management engine 110 creates a first transient backup TB1a (corresponding to a first air-gapped backup). This first transient backup TB1a may be a short-lived native backup for point-in-time data of a client asset in a client account. The creation of the first transient backup TB1a may involve capturing a snapshot of the current state of the client asset data at a specific point in time.

Following the creation of the first transient backup TB1a, the backup scheduling and management engine 110 may receive a request to create a second air-gapped backup corresponding to a second transient backup TB2a in step 705. In some implementations, the second transient backup TB2a may subsequent to the first transient backup TB1a corresponding to a first air-gapped backup. This request may be triggered by a predefined backup schedule or an on-demand request from a user. The second transient backup TB2a may also be a short-lived native backup capturing the state of the client asset data at a later point in time.

At step 706, a client backup manager 130 may determine whether the second transient backup TB2a matches the first transient backup TB1a. As an example, the client backup manager 130 may check for differential data blocks between the first transient backup TB1a and the second transient backup TB2a. Step 706 may involve comparing the data blocks of the first and second transient backups TB1a and TB2a to identify whether changes have occurred between these two transient backups TB1a and TB2a. The differential data blocks represent the changes in the client asset data from the time of the first transient backup TB1a to the time of the second transient backup TB2a.

If differential data blocks are found, indicating that changes have occurred in the client asset data, the method 700 follows the original backup process, which may involve using backend microservices to extract the changed data blocks and store them, e.g., in a cloud object store.

If no differential data blocks are identified, indicating that no changes have occurred in the client asset data since the first transient backup TB1a, the backup scheduling and management engine 110 creates the second database entry B2b (e.g., corresponding to a second air-gapped cloud backup database entry). In some implementations, the second database entry B2b may serve as a reference to the first database entry B1b, which corresponds to the first transient backup TB1a, thereby avoiding the need to create a new backup.

In some implementations, the method 700 includes step 708, where the backup scheduling and management engine 110 increments a reference counter for the first transient backup database entry B1b. Step 708 maintains the integrity of the backup system by tracking the number of references to the first transient backup TB1*a*. The incremented reference counter indicates that the first transient backup TB1*a* is being referenced by the second transient backup TB2*a*.

Although FIG. 7 shows example blocks of the method 700, in some implementations, the method 700 may include additional blocks, fewer blocks, different blocks, or differently arranged blocks than those depicted in FIG. 7. Additionally, two or more of the blocks of process 700 may be performed in parallel.

Figure 8:
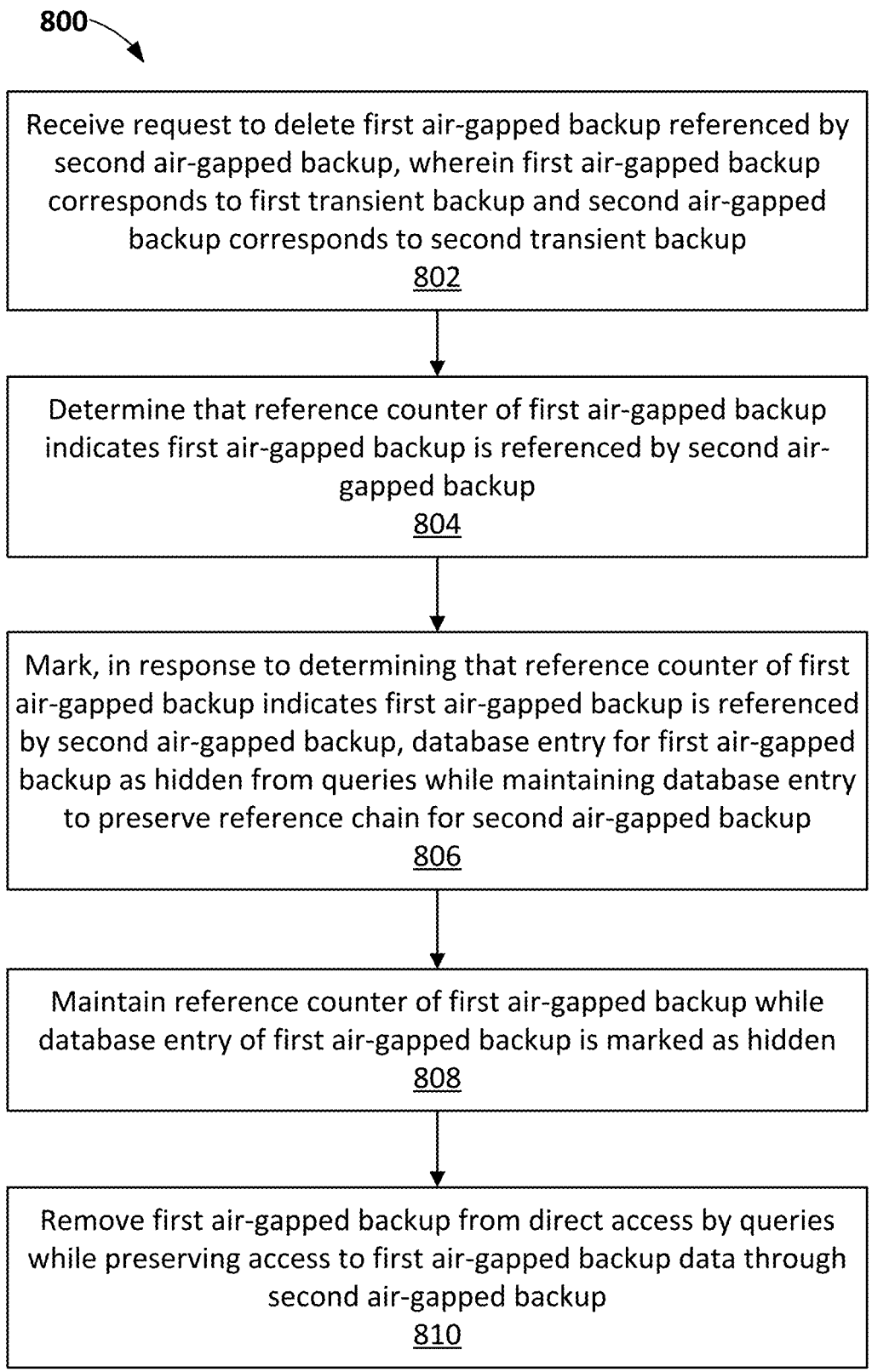
FIG. 8 illustrates an example backup method, according to some implementations.

FIG. 8 illustrates an example backup method 800, according to some implementations. In some implementations, one or more method steps of FIG. 8 may be performed by the backup systems 100 and 300.

The method 800 for deleting a first air-gapped backup in a database of the storage 120 while allowing access to the backup data through a second air-gapped backup may be implemented using components described in previous figures, such as the backup system 100 shown in FIG. 1 and FIG. 2. The method 800 may involve communication between the backup scheduling and management engine 110, the storage 120, and/or the backup store manager 140.

In step 802, the backup scheduling and management engine 110 may receive a request to delete a first air-gapped backup that is referenced by a second air-gapped backup. In some implementations, the first air-gapped backup may correspond to a first transient backup (e.g., the first transient backup TB1*a* in FIG. 4A), while the second air-gapped backup may correspond to a second transient backup (e.g., the second transient backup TB2*a* in FIG. 4A).

For step 804, the data protection engine 208 within the backup scheduling and management engine 110 may query the storage 120 to determine the reference counter of the first air-gapped backup. The reference counter of the first air-gapped backup, e.g., the reference counters 404*a*-404*d* shown in FIGS. 4A-4B, may indicate that the first air-gapped backup may be referenced by the second air-gapped backup.

In step 806, upon determining that the reference counter indicates the first air-gapped backup is referenced by the second air-gapped backup, the data protection engine 208 may instruct the storage 120 to mark the database entry for the first air-gapped backup as hidden or invisible from queries. In some implementations, such marking may maintain the reference chain for the second air-gapped backup while removing direct access to the first air-gapped backup.

As an example, the direct access may involve the data protection engine 208 allowing authorized users or systems to run queries directly against the air-gapped backup data stored in the object storage repository 226 without first restoring or copying the data to a separate environment. In step 806, such direct access to run queries against the first air-gapped backup may be reduced or eliminated by marking the database entry for the first air-gapped backup as hidden from such direct queries making the first air-gapped backup substantially invisible to, for example, user queries.

For step 808, the storage 120 may maintain the reference counter of the first air-gapped backup, even though its database entry may be marked as hidden. Such maintenance of the reference counter of the first air-gapped backup may provide the integrity of the reference chain and may allow for management of the backup dependencies.

In step 810, the backup store manager 140 may update records of the backup store manager 140 to remove the first air-gapped backup from direct access by queries. However, the actual backup data may remain accessible through the second air-gapped backup, thus preserving data integrity and allowing for potential future recovery if such recovery may be appropriate.

Although FIG. 8 shows example blocks of the method 800, in some implementations, the method 800 may include additional blocks, fewer blocks, different blocks, or differently arranged blocks than those depicted in FIG. 8. Additionally, or alternatively, two or more of the blocks of method 800 may be performed in parallel.

Figure 9:
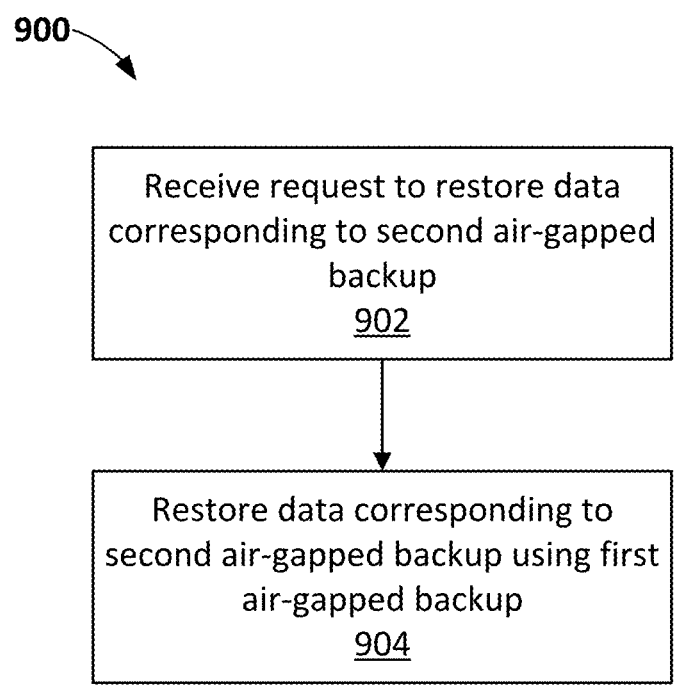
FIG. 9 illustrates an example backup method, according to some implementations.

FIG. 9 illustrates an example backup method 900, according to some implementations. The method 900 for restoring data corresponding to the second air-gapped backup may be implemented using components described in previous figures, such as the backup system 100 shown in FIG. 1 and FIG. 2 or the backup system shown in FIG. 3. The method 900 may involve communication between the backup scheduling and management engine 110, the storage 120, the backup store manager 140, and/or the client backup manager 130.

In step 902, the backup scheduling and management engine 110 may receive a request to restore data corresponding to the second air-gapped backup. This request may come from a user or an automated system requesting to recover data from a specific point in time represented by the second air-gapped backup.

For step 904, the data protection engine 208 within the backup scheduling and management engine 110 may initiate the process of restoring data corresponding to the second air-gapped backup using the first air-gapped backup. In some implementations, during step 904, the data protection engine 208 queries the storage 120 to retrieve the metadata and/or reference information for the second air-gapped backup. Upon determining that the second air-gapped backup references the first air-gapped backup, the backup systems 100 or 300 may locate the entry for the first air-gapped backup, even if the entry for the first air-gapped backup marked as hidden from queries.

In some implementations, the backup store manager 140 may use the object store engine 222 to retrieve from the object storage repository 226 the actual backup data, which corresponds to the first air-gapped backup. In some implementations, if incremental changes are stored in the second air-gapped backup, the backup system 100 or 300 may apply the incremental changes to the backup data from the first air-gapped backup.

In some implementations, the data extraction engine 220 within the backup store manager 140 may process the retrieved data, preparing the data for restoration. The client backup manager 130 may perform the actual restoration of the processed data to the target system or location specified in the restore request. Throughout this process, the air-gap implementation engine 228 may allow the integrity of the air-gapped backups to be maintained, allowing access through appropriate channels and authentication.

Although FIG. 9 shows example blocks of the method 900, in some implementations, the method 900 may include additional blocks, fewer blocks, different blocks, or differently arranged blocks than those depicted in FIG. 9. Additionally, or alternatively, two or more of the blocks of method 800 may be performed in parallel.

While some implementations are described to operate in cloud environments, it should be understood that the systems and methods disclosed herein are not limited to cloud-based systems and methods. Certain implementations can operate in various other computing environments and architectures, such as on-premises data centers, edge computing environments, hybrid environments, virtualized environments, distributed computing systems, IoT networks, high-performance computing clusters, fog computing architectures, multi-cloud environments, and/or other suitable computing environments and architectures.

A number of implementations have been described. Nevertheless, it will be understood that various modifications may be made without departing from the spirit and scope of the disclosure. Accordingly, other implementations are within the scope of the following claims.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A computer system, comprising:
   one or more processors; and
   a non-transitory computer-readable medium storing programming for execution by the one or more processors, the programming comprising instructions to:
   receive a request to create a second air-gapped backup corresponding to a second transient backup, wherein the second transient backup is subsequent to a first transient backup corresponding to a first air-gapped backup;
   determine, in response to the request to create the second air-gapped backup, whether the second transient backup matches the first transient backup;
   create, in response to determining that the second transient backup matches the first transient backup, a database entry for the second air-gapped backup that references the first air-gapped backup; and
   increment, in response to determining that the second transient backup matches the first transient backup, a reference counter for the first air-gapped backup; and
   mark the first transient backup as invisible to user queries in response to a reference counter of the first transient backup being zero and in response to the first transient backup being referenced by other backups.

2. The computer system of claim 1, wherein the programming comprises instructions to perform a block-level comparison between the first transient backup and the second transient backup to determine whether the second transient backup matches the first transient backup.

3. The computer system of claim 1, wherein the database entry includes at least one of an air-gapped backup identification or a reference of the second air-gapped backup to the first air-gapped backup.

4. The computer system of claim 1, wherein the programming further comprises instructions to:
   delete the database entry for the second air-gapped backup by decrementing the reference counter of the first air-gapped backup; and
   remove the database entry for the second air-gapped backup.

5. The computer system of claim 1, wherein the one or more processors are configured to restore, in response to receiving a request to restore data corresponding to the second air-gapped backup, data corresponding to the second air-gapped backup using the first air-gapped backup.

6. The computer system of claim 1, wherein at least one of the first transient backup or the second transient backup comprises data block hashes.

7. The computer system of claim 6, wherein determining whether the second transient backup matches the first transient backup is based on comparison of the data block hashes of the second transient backup and the data block hashes of the first transient backup.

8. The computer system of claim 1, wherein the request to create the second transient backup comprises at least one of a request to generate the second transient backup or a request to cause generating the second transient backup.

9. The computer system of claim 1, wherein determining whether the second transient backup matches the first transient backup comprises at least one of comparing the second transient backup and the first transient backup or causing to compare the second transient backup and the first transient backup.

10. A computer system, comprising:
    one or more processors; and
    a non-transitory computer-readable medium storing programming for execution by the one or more processors, the programming comprising instructions to:
    receive a request to delete a first air-gapped backup referenced by a second air-gapped backup, wherein the first air-gapped backup corresponds to a first transient backup and the second air-gapped backup corresponds to a second transient backup;
    determine that a reference counter of the first air-gapped backup indicates the first air-gapped backup is referenced by the second air-gapped backup;
    mark, in response to the determining that a reference counter of the first air-gapped backup indicates the first air-gapped backup is referenced by the second air-gapped backup, a database entry for the first air-gapped backup as hidden from queries while maintaining the database entry to maintain a reference chain for the second air-gapped backup;
    maintain the reference counter of the first air-gapped backup while the database entry of the first air-gapped backup is marked as hidden; and
    remove the first air-gapped backup from a direct access by queries while allowing access to first air-gapped backup data through the second air-gapped backup.

11. The computer system of claim 10, wherein the programming further comprises instructions to:
    delete the database entry for the first air-gapped backup after determining the reference counter has reached zero.

12. The computer system of claim 10, wherein the programming further comprises instructions to:
    receive a request to delete the second air-gapped backup;
    determine that there is an absence of air-gapped backups referencing the second air-gapped backup based on a reference counter of the second air-gapped backup;

delete, in response to determining that no air-gapped backups reference the second air-gapped backup, the database entry for the second air-gapped backup and decrement the reference counter of the first air-gapped backup; and delete the database entry for the first air-gapped backup in response to the reference counter of the first air-gapped backup reaching zero.

13. The computer system of claim 10, wherein a first air-gapped backup is referenced by a second air-gapped backup based on the second transient backup matching the first transient backup.

14. A computer-implemented method for creating a second air-gapped backup, the method comprising:

receiving a request to create a second air-gapped backup corresponding to a second transient backup, wherein the second transient backup is subsequent to a first transient backup corresponding to a first air-gapped backup;

determining whether the second transient backup matches the first transient backup in response to the request to create the second air-gapped backup;

creating a database entry for the second air-gapped backup that references the first air-gapped backup in response to determining that the second transient backup matches the first transient backup; and incrementing a reference counter for the first air-gapped backup in response to determining that the second transient backup matches the first transient backup; and marking the first transient backup as invisible to user queries in response to a reference counter of the first transient backup being zero and in response to the first transient backup being referenced by other backups.

15. The computer-implemented method of claim 14, further comprising:

deleting the database entry for the second air-gapped backup by decrementing the reference counter of the first air-gapped backup; and removing the database entry for the second air-gapped backup.

16. The computer-implemented method of claim 14, further comprising:

restoring, in response to receiving a request to restore data corresponding to the second air-gapped backup, data corresponding to the second air-gapped backup using the first air-gapped backup.

17. The computer-implemented method of claim 14, wherein determining whether the second transient backup matches the first transient backup further comprises:

a data block-level comparison between the first transient backup and the second transient backup to determine whether the second transient backup matches the first transient backup.

18. The computer-implemented method of claim 14, wherein the database entry includes at least one of an air-gapped backup identification or a reference of the second air-gapped backup to the first air-gapped backup.

\* \* \* \* \*